(12) United States Patent
Anderson et al.

(10) Patent No.: US 7,153,575 B2
(45) Date of Patent: Dec. 26, 2006

(54) PARTICULATE MATERIAL HAVING MULTIPLE CURABLE COATINGS AND METHODS FOR MAKING AND USING SAME

(75) Inventors: Robert William Anderson, Houston, TX (US); Tom Diep, Sugarland, TX (US); Avis Lloyd McCrary, Montgomery, TX (US)

(73) Assignee: Borden Chemical, Inc., Columbus, OH (US)

( * ) Notice: Subject to any disclaimer, the term of this patent is extended or adjusted under 35 U.S.C. 154(b) by 164 days.

(21) Appl. No.: 10/445,899

(22) Filed: May 28, 2003

(65) Prior Publication Data

US 2003/0224165 A1 Dec. 4, 2003

Related U.S. Application Data

(60) Provisional application No. 60/385,578, filed on Jun. 5, 2002, provisional application No. 60/384,419, filed on Jun. 3, 2002.

(51) Int. Cl.
*B05D 1/36* (2006.01)
*B32B 5/16* (2006.01)

(52) U.S. Cl. ............... 428/407; 427/221; 427/407.1

(58) Field of Classification Search ............... 428/407, 428/403; 427/221, 407.1
See application file for complete search history.

(56) References Cited

U.S. PATENT DOCUMENTS

| | | | |
|---|---|---|---|
| 3,254,717 A | 6/1966 | Huitt et al. | |
| 3,404,735 A | 10/1968 | Young et al. | |
| 3,659,651 A | 5/1972 | Graham | |
| 4,255,554 A | 3/1981 | Wuskell | |
| 4,585,064 A | 4/1986 | Graham et al. | |
| 4,597,991 A | 7/1986 | Graham et al. | |
| 4,677,187 A | 6/1987 | Armbruster et al. | |
| 4,694,905 A | 9/1987 | Armbruster | |
| 4,713,294 A | 12/1987 | Armbruster et al. | |
| 4,722,991 A | 2/1988 | Armbruster | |
| 4,732,920 A | 3/1988 | Graham et al. | |
| 4,785,884 A | 11/1988 | Armbruster | |
| 4,888,240 A | 12/1989 | Graham et al. | |
| 4,990,373 A | 2/1991 | Kittle | |
| 5,055,217 A | 10/1991 | Garcia et al. | |
| 5,188,879 A | 2/1993 | Hill et al. | |
| 5,218,038 A | 6/1993 | Johnson et al. | |

(Continued)

FOREIGN PATENT DOCUMENTS

EP 0308257 3/1989

(Continued)

OTHER PUBLICATIONS

R.J. Card et al, Journal SPE Productions and Facilities, "A Novel Technology To Control Proppant Backproduction", Nov. 1995, vol. 10, No. 4, p. 271-276.

(Continued)

*Primary Examiner*—H. Thi Le
(74) *Attorney, Agent, or Firm*—Cantor Colburn LLP

(57) ABSTRACT

The present invention relates to coated particulate matter wherein the particles are individually coated with a first set of one or more layers of a curable resin, for example, a combination of phenolic/furan resin or furan resin or phenolic-furan-formaldehyde terpolymer, on a proppant such as sand, and the first set of layers is coated with a second set of one or more layers of a curable resin, for example, a novolac resin with curative. Methods for making and using this coated product as a proppant, gravel pack and for sand control are also disclosed.

106 Claims, 1 Drawing Sheet

U.S. PATENT DOCUMENTS

| | | | |
|---|---|---|---|
| 5,223,165 A | 6/1993 | Winstanley et al. | |
| 5,330,005 A | 7/1994 | Card et al. | |
| 5,422,183 A | 6/1995 | Sinclair et al. | |
| 5,425,994 A * | 6/1995 | Harry et al. | 428/403 |
| 5,439,055 A | 8/1995 | Card et al. | |
| 5,486,557 A | 1/1996 | Akerberg | |
| 5,501,275 A | 3/1996 | Card et al. | |
| 5,531,274 A | 7/1996 | Bienvenu, Jr. | |
| 5,595,782 A | 1/1997 | Cole | |
| 5,597,784 A | 1/1997 | Sinclair et al. | |
| 5,603,745 A | 2/1997 | Petterson et al. | |
| 5,639,806 A | 6/1997 | Johnson et al. | |
| 5,703,144 A | 12/1997 | Akerberg | |
| 5,741,914 A | 4/1998 | Everett et al. | |
| 5,837,656 A | 11/1998 | Sinclair et al. | |
| 5,849,858 A | 12/1998 | Everett et al. | |
| 5,921,317 A | 7/1999 | Dewprashad et al. | |
| 5,924,488 A | 7/1999 | Nguyen et al. | |
| 5,955,144 A * | 9/1999 | Sinclair et al. | 427/214 |
| 5,968,222 A | 10/1999 | Kodali | |
| 6,059,034 A | 5/2000 | Rickards et al. | |
| 6,114,410 A * | 9/2000 | Betzold | 523/130 |
| 6,264,861 B1 | 7/2001 | Tavernier et al. | |
| 6,330,916 B1 | 12/2001 | Rickards et al. | |
| 6,358,309 B1 | 3/2002 | Langford | |
| 6,364,018 B1 | 4/2002 | Brannon et al. | |
| 6,364,019 B1 | 4/2002 | Aggour et al. | |
| 6,382,319 B1 | 5/2002 | Hill, Jr. et al. | |
| 6,406,789 B1 | 6/2002 | McDaniel et al. | |
| 6,491,736 B1 | 12/2002 | Bell et al. | |
| 6,528,157 B1 | 3/2003 | Hussain et al. | |
| 6,582,819 B1 * | 6/2003 | McDaniel et al. | 428/402 |
| 2002/0013387 A1 | 1/2002 | Weier et al. | |
| 2002/0148388 A1 | 10/2002 | Varnadoe et al. | |
| 2003/0224165 A1 | 12/2003 | Anderson et al. | |

FOREIGN PATENT DOCUMENTS

| | | |
|---|---|---|
| EP | 0919415 | 10/1994 |
| EP | 0735234 | 10/1996 |
| EP | 771935 | 5/1997 |
| GB | 2277112 | 10/1994 |
| WO | 9927229 | 6/1999 |

OTHER PUBLICATIONS

Springer-Verlag, "Phenolic Resins", pp. 50-53, 1985.

American Petroleum Institute, "Recommended Practices for Testing High Strength Proppants Used in Hydraulic Fracturing Operations" 1989, pp. 11 and 14-16.

Allan Rickards et al., "Need Stress Relief? A New Approach to Reducing Stress Cycling Induced Proppant Pack Failure", 1998, pp. 1-16.

"A High Strength Dual Resin Coated Proppant" Santrol Techincal Bulletin, Super HS, pp. 1-4, Santrol, Fresno, TX.

"An Intermediate Strength, Dual Resin Coated Proppant" Santrol Technical Bulletin, Super DC, pp. 1-4, Santrol, Fresno, TX.

* cited by examiner

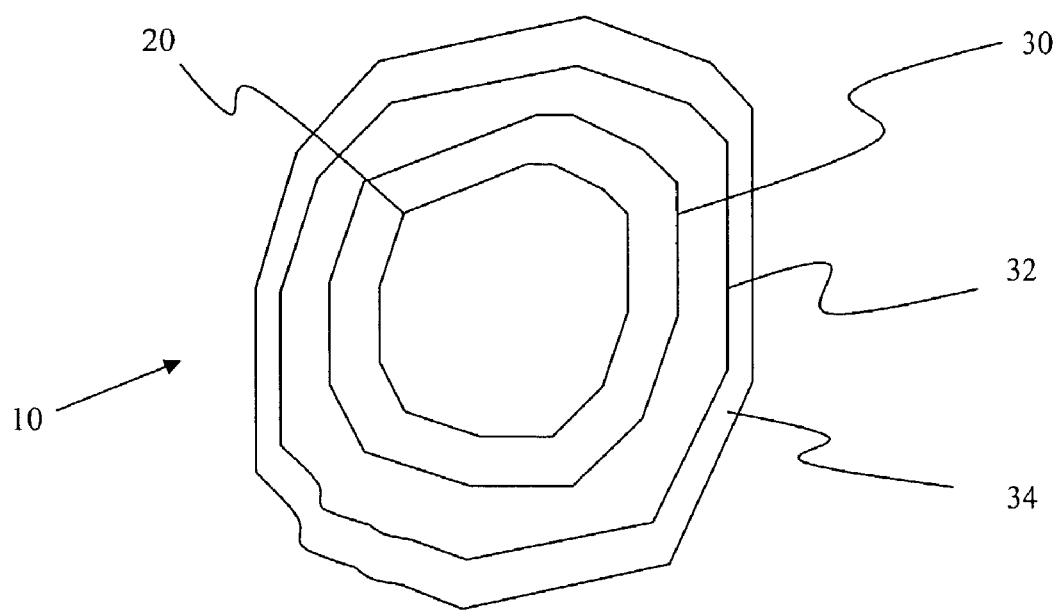

PARTICULATE MATERIAL HAVING MULTIPLE CURABLE COATINGS AND METHODS FOR MAKING AND USING SAME

I. CROSS-REFERENCE TO RELATED APPLICATIONS

This claims priority from U.S. provisional patent application Ser. No. 60/385,578 filed Jun. 5, 2002 and U.S. provisional patent application Ser. No. 60/384,419 filed Jun. 3, 2002, both of which are incorporated herein by reference in their entirety.

II. BACKGROUND OF THE INVENTION

A. Field of the Invention

The present invention relates to coated particulate matter wherein the particles are individually coated with a first set of one or more layers of a curable resin, for example, a combination of phenolic/furan resin or furan resin or phenolic-furan-formaldehyde terpolymer, on a proppant such as sand, and the first set of layers is coated with a second set of one or more layers of a curable resin, for example, a novolac resin. Methods for making and using this coated product as a proppant, gravel pack and for sand control are also disclosed.

B. Background Description

The term "proppant" is indicative of particulate material which is injected into fractures in subterranean formations surrounding oil wells, gas wells, water wells, and other similar bore holes to provide support to hold (prop) these fractures open and allow gas or liquid to flow through the fracture to the bore hole.

U.S. Pat. No. 4,694,905 to Armbruster, incorporated herein by reference, discloses coated particulate matter wherein the particles are individually coated with a cured combination of phenolic/furan resin or furan terpolymer resin to form a precured resin coating on a proppant such as sand, thereby substantially improving the chemical resistance of the proppant over one having a straight phenolic precured coating. Another embodiment of this invention involves the use of multiple resin coatings on the particulate matter to form a final layered coating containing the desired amount of cured resin.

U.S. Pat. No. 4,722,991 to Armbruster, incorporated herein by reference, discloses a terpolymer is prepared from phenol, furfuryl alcohol and formaldehyde wherein a substantial amount of the furfuryl alcohol is catalytically reacted by means of a water soluble multivalent metal salt catalyst, and wherein the reaction is carried out under essentially hydrous conditions.

U.S. Pat. No. 4,677,187 to Armbruster, incorporated herein by reference, discloses a furfuryl alcohol formaldehyde resin that can be prepared using a water soluble multivalent metal salt catalyst.

U.S. Pat. No. 4,888,240 to Graham et al., incorporated herein by reference, discloses a resin coated proppant particle that comprises a particulate substrate, a cured inner resin coating and a curable outer resin coating.

U.S. Pat. No. 5,837,656 to Sinclair et al., incorporated herein by reference, discloses a resin coated proppant particle that comprises a particulate substrate, an inner coating of a curable resin and an outer coating of a cured resin. These resin coated particles are produced by first coating the substrate with a reactive resin. A second or outer coating of a resin is then coated over the inner curable resin coating and subjected to conditions of time and temperature sufficient to cure the outer coating while the inner coating remains curable.

Proppants are commonly used to prop open fractures formed in subterranean formations such as oil and natural gas wells during hydraulic fracturing. The proppants may be precured or curable. The precured proppants are cured prior to insertion into the subterranean formation. The curable proppants are cured downhole to form a consolidated proppant pack. Resin formulations typically used for curable coatings on proppant substrates (sand, ceramic, etc.) result in a highly crosslinked coating on the surface of the substrates. Although this usually results in maximizing the thermal properties of the coatings, it is not necessarily a preferred condition for coatings of interest to the oilfield industry where temperatures rarely ever exceed 400° F., but are subjected to stresses that will breakdown brittle bonding.

Curable phenolic resin coated sands have been commercially available for use as propping agents. A curable phenolic resin coating has a phenolic resin which is at least partially, and not fully cured, in contrast with the term "precured" which means that the phenolic resin coating is a cured coating, which is also commercially available.

Another aspect of obtaining production from a subterranean formation is that to extract hydrocarbons such as natural gas and crude oil from the earth's subsurface formations, boreholes are drilled into hydrocarbon bearing production zones. However, production of oil, gas and water from unconsolidated or weakly consolidated formations is normally accompanied by the production of formation sand particles along with the produced fluids. The production of sand with the well fluids poses serious problems such as the erosion of sub-surface and surface production facilities and the accumulation of the sand in the wellbore and surface separators. Several methods such as gravel packing, screens and plastic consolidation have been in use for many years with varying success. However, these methods have several-technical and cost limitations. Further discussion of sand control is presented by U.S. Pat. No. 6,364,019 incorporated herein by reference in its entirety.

To maintain the productivity of a borehole and control the flow of hydrocarbon fluids from the borehole, numerous prior art devices and systems have been employed to prevent the natural forces from collapsing the borehole and obstructing or terminating fluid flow therefrom. One such prior art system provides a full depth casement of the wellbore whereby the wellbore wall is lined with a steel casing pipe that is secured to the bore wall by an annulus of concrete between the outside surface of the casing pipe and the wellbore wall. The steel casing pipe and surrounding concrete annulus is thereafter perforated by ballistic or pyrotechnic devices along the production zone to allow the desired hydrocarbon fluids to flow from the producing formation into the casing pipe interior. Usually, the casing interior is sealed above and below the producing zone whereby a smaller diameter production pipe penetrates the upper seal to provide the hydrocarbon fluids a smooth and clean flowing conduit to the surface.

Another well completion system protects the well borewall production integrity by a tightly packed deposit of aggregate comprising sand, gravel or both between the raw borewall and the production pipe thereby avoiding the time and expense of setting a steel casing from the surface to the production zone which may be many thousands of feet below the surface. The gravel packing is inherently permeable to the desired hydrocarbon fluid and provides structural reinforcement to the bore wall against an interior collapse or flow degradation. Such well completion systems are called "open hole" completions. The apparatus and process by which a packed deposit of gravel is placed between the borehole wall and the production pipe is encompassed within the definition of an "open hole gravel pack system." Unfortunately, prior art open hole gravel pack systems for placing and packing gravel along a hydrocarbon production zone have been attended by a considerable risk of precipitating a borehole wall collapse due to fluctuations in the borehole pressure along the production zone. These pressure fluctuations are generated by surface manipulations of the downhole tools that are in direct fluid circulation within the well and completion string. Further discussion of gravel packs is presented by U.S. Pat. No. 6,382,319 incorporated herein by reference.

It would be desirable to provide improved particles for use as proppants, gravel pack, and/or for sand control in subterranean formations.

III. SUMMARY OF THE INVENTION

The present invention relates to coated particulate matter wherein particles of a proppant substrate, such as sand or ceramic, are individually coated with two or more curable coatings wherein all coatings on the particle are curable. Where the coatings have different compositions, the invention generally comprises at least one inner coating comprising a curable resin, on the proppant substrate and then coated with at least one outer coating comprising a second curable resin. By different compositions it is meant resins having different chemical formulas rather than the same formulas but a different degree of cure.

The terms "cured" and "curable" are defined for the present specification by three tests historically employed in the art, and can be used to measure the state of both the inner and outer coatings.

a) Temperature Stick Point Test: placing coated material on a heated meltpoint bar and determining the lowest temperature at which the coated material sticks. A "sticking temperature" of greater than 350° F., typically indicates a cured material, depending upon the resin system used.

b) Acetone Extraction Test: an acetone extraction method, as described below, to dissolve the fraction of resin that is uncured.

c) Compressive Strength Test: no bonding, or no consolidation of the coated particles, following wet compression at 1000 psi at 250° F. for a period of as much as 24 hours, indicates a cured material.

However, unless otherwise indicated, the terms cured and curable are defined by the Acetone Extraction Test.

In one embodiment, the coated particulate matter has a first inner coating comprising a furan resin, a curable combination of phenolic and furan resin, or a curable furan terpolymer resin to form at least one curable resin coating on the proppant substrate and at least one outer coating comprising curable phenol formaldehyde novolac resin to provide a curable proppant having curable inner layer(s) and curable outer layer(s) suitable for injecting in its curable state into a subterranean formation. The present invention may also include embodiments having multiple outer and/or inner coatings, for example, two inner coatings of curable resin, such as furan terpolymer, applied to the substrate, with three coatings of curable resin, such as phenol formaldehyde novolac, coatings applied thereto. However, the order and number of the resin layers is not particularly limited. Additionally, it is considered within the scope of the present invention to utilize any curable resin for the coatings. For example, any thermoset resin, such as an epoxy modified phenolic, urethane resin or those disclosed in U.S. Pat. No. 4,585,064 to Graham et al. (herein incorporated by reference in its entirety), may be used as the curable resin for the inner or the outer coating.

The present invention also relates to a method of making a curable proppant with only curable layers, comprising coating a particle substrate with at least one inner curable layer comprising, for example, a curable furan resin, a curable combination of phenolic (resole) resin and furan resin, or a curable phenol-formaldehyde-furan terpolymer resin, to form a curable resin coating on the proppant substrate and then a second coating with at least one outer coating comprising a curable resin. As the layers are applied, the temperature during the coating of the layers is reduced relative to typical temperatures for applying coatings.

The temperatures, curative levels and concentrations, catalyst levels and concentrations and other factors are typically selected as to provide viable cycle times, while simultaneously prohibiting totally cured resin layers. The temperatures and catalysts or other curatives, as well as concentrations thereof, are often selected to partially, but not completely, convert the reactive resins.

For example, the substrate may be heated to about 400–550° F. or 400–530° F., typically 400–410° F. or 405–410° F., before the heat is removed and the various resin layers are applied. As such, the temperature of the substrate (including any resin applied thereto) during coating can be in the range of about 250–550° F. The temperature to which the substrate is heated is particularly selected to such that the resin is melted, such that it may adequately cover or wet the substrate. Additionally, the temperature must be limited, such that the resin does not fall apart or thermally degrade and the cure of the resin may be accurately controlled.

The concentration of curative (e.g., catalyst or crosslinker) may be reduced by a factor of four from the levels of the curative conventionally used to be about 25% of the concentrations employed for conventional precured proppants or conventional curable proppants to only partially effect the conversion of the inner furan resole and reduce the amount used in the second layer of furan by a factor of two. The amount of curative can be adjusted to achieve any degree of cure desired, as long as the resin maintains its curable state, as defined above. As a result of the exceptionally low curative level, in at least some embodiments, the resin, at the time the curative is spent downhole, will not be as crosslinked as a conventional curable proppant or a conventional pre-cured proppant made from that resin.

The product typically has resiliency defined as being able to withstand a standard cyclic loading test of 30 cycles without going above 15% flowback.

The curatives may also be used at levels low enough to effect a further ultimate conversion of the reactive resins (once placed underground) into lightly crosslinked resilient coatings to provide other advantageous properties. For example, the particles may be heated to a temperature over 400° F., and catalyst concentrations may be in a range from about 0.05–0.25% based on the amount of furan resole, by weight, or in a range of 2–15%, by weight curative, based on the level of, for example, novolac resin, used.

In one embodiment, the furan resins, every combination of resole and furan, or every terpolymer of phenolic-furan-formaldehyde inner coating is applied when the particle is at a temperature in the range from 380 to 450° F. and every novolac outer coating is applied when the particle is at a temperature in the range from 200 to 300° F. If however, the temperature of the substrate is outside these ranges, the amount of crosslinking agent (or catalyst) may be adjusted to achieve the desired degree of cure. For example, if the substrate were at a temperature of 500° F. when the novolac resin system is added, the hexa solution may be diluted with for example, water, as to reduce the degree of cure. Similarly, if the temperature of the substrate were only 350° F. when the furan-formaldehyde inner coating is to be added, the amount of acid catalyst may be increased to increase the degree of cure of this layer. Thus, it can be seen that by adjusting the level of crosslinking agent in response to differing temperatures, a wide range of degrees of cure can be achieved. This provides the method of the invention with a large temperature operational range.

Moreover, the catalyst levels are reduced for the resole furan inner coatings by 98%, typically by 75%, relative to typical catalyst levels for a precured coating. Thus, the catalyst level for the inner coatings is in the range from 0.05 to 0.25 weight %, for example from 0.1 to 0.15%, based on total resin weight for that coating on a dry-solvent free basis.

The level of hexamethylene tetramine crosslinker (also known as "hexa") is reduced by 70–90% in the outer coating as compared to conventional novolac coatings. Thus, the hexa level for the outer coatings is in the range from 1 to 5 weight %, for example 3 to 4%, based on total resin weight for that coating layer on a dry-solvent free basis.

This invention also involves a method for making a proppant comprising multiple curable resin coatings on the particulate matter to form a final layered coating containing the desired amount of curable resin as well as methods for using such proppants.

The present invention additionally addresses the need for resilient coatings with adequate thermal properties.

Moreover, the present invention typically accomplishes this task with the additional unexpected potential advantage of defining resin coated materials that retain the capability to develop bond strength even when subjected to aqueous media at elevated temperatures during a slurry test, as defined below. Also, the present inventors appreciated that when a well produces, pressure (weight) on the proppant in the well goes up, and when a well is closed the pressure (weight) on the proppant goes down because the oil or gas is pushing open the fracture. Thus, after curing the curable proppants to form a consolidated proppant pack, the well may undergo cyclic stress and or stress changes to break apart the consolidated proppant pack and cause flow back of the resulting broken proppant pack, either in individual particles, or consolidated groups of particles.

However, after being placed in a subterranean formation and cured, the present multiple curable coating of particulate material has some ability to rebond after being subjected to cyclic stress. Thus, if during well production bonds break, in a consolidated proppant pack comprising the present proppant, the operator of the well could shut down the well and rebond the particles to each other.

The proppants of the present invention show improved rebonding over conventional proppants. Rebonding is measured by conducting the Unconfined Compression Test (UCS) on the resin coated proppant wherein a value for the compressive strength is determined as detailed in the UCS test protocol. The consolidated slug from this test is further broken down to individual particles by repeated abrasion across a metal screen (~20 mesh), until essentially individual particles are recovered. These particles are re-screened to isolate a desired size range (i.e. 20/40). The sized particles are once again subjected to the Unconfined Compression Test as described elsewhere. The UCS values are determined and compared to the original strength values that were documented for this particular resin coated proppant. Rebond strength is reported at a percentage of the original UCS bond strength.

This ability to rebond is advantageous. It permits "formerly curable" proppant particles, which disengage from the proppant pack, to reattach to the proppant pack before being entrained out of the subterranean formation. This is unexpected because it would have been expected that curable particles after curing would not retain significant ability to reattach.

Another potential advantage of this particulate material having multiple curable coatings is to provide retention of bond strength. This can be measured by initially measuring a sample of the proppant by the Unconfined Compressive Strength (UCS) test, as defined below under the heading "Coated Particle Parameters", and then subjecting a second sample of the proppant to a "slurry test" to determine the percentage of the proppant's original UCS remaining after the Slurry Test.

In the Slurry Test a sample of resin coated particles is initially subjected to the below-described Unconfined Compressive Strength (UCS) test. Another sample of the resin coated particles is added to a 2% solution of KCl at a ratio of 12 pounds of particles per gallon of KCl solution, followed by heating to 200° F. for the test period, e.g., 1, 2 or 3 hours. Thereafter, the particles are recovered, and the Unconfined Compressive Strength (UCS) test, as defined below, is performed. A comparison of the UCS of the sample after the heated Slurry Test to the UCS of the sample before the Slurry Test indicates bond-strength retention. Values of bond strength retention are reported as percent of original values prior to exposing the sample to a hot slurry challenge, i.e., (UCS after slurry challenge/UCS before slurry challenge×100%). The compressive strength of the coated particles of the invention after the slurry test is typically at least about 60%, preferably at least about 70%, 80% or 90%, of their initial compressive strength. Most preferably the compressive strength of the coated particles of the invention after the slurry test is about 100%, of their initial compressive strength. This indicates an extraordinary retention of initial bond strength.

Advantageously, the particles not only provide a high percentage of bond-strength retention, but also have a high value of UCS after the slurry test, e.g., a UCS of at least about 500 psi, at least about 1000 psi, or at least about 1500 psi.

Retention of bond strength is advantageous. Generally, the coated proppants are delivered to the site in a truck or other vehicle and must be pumped into the well. Even after pumping, the proppant particles must work themselves, via hydraulic transportation, into the fractures. Such steps often take 6 or more hours. Accordingly, the slurry test indicates the strength of the resulting proppant pack following those steps. A high percentage of retention of bond strength indicates the particles do not lose their potential to form strong proppant packs during delivery. A low percentage of retention of bond strength indicates the particular proppant composition loses its ability to form strong packs during the trip downhole, when compared to the strength potential before delivery.

In other words, these multiple coatings do not fully prematurely cure during conditions normally associated with the initial placement of the proppant into the formation. Thus, they retain the potential to bond after being subjected to stresses encountered within the formation during initial proppant placement. Typically, about 1–4 hours are necessary to achieve any measurable bond strength, depending on the temperatures encountered and chemical compositions. Thus, the multiple coatings do not prematurely set up in the well.

This invention also achieves resinous coated oilfield proppants having unexpected tolerance to continue to resist flowback from the underground formations even when subjected to occasional cyclic stress(es). For example, when the well is closed, pressure builds up within the subterranean formation to assist in keeping open fractures which contain consolidated proppant. However, when the well is closed, the fluid pressure drops such that the fractures further squeeze the consolidated proppant contained within these fractures. Prior to this development, cyclic pressure stresses have resulted in the backproduction, or flowback, of proppant from the formations, which (1) reduces the hydrocarbon production from the fracture, and (2) causes problems above ground as the proppant comes back into hydrocarbon production equipment. The Cyclic Stress Test, described under the heading "Coated Particle Parameters", measures how a consolidated proppant pack responds to this stress and movement caused in a subterranean formation during normal operation. This relates to shifting within the subterranean formation caused by repeated opening and closing of the well to the subterranean formation or other natural occurrences. It would be desirable to provide a proppant better able to withstand this stress.

Another potential advantage of this proppant is that it controls the curing of the outer layer so that it will generate bond strength under closure stress in the fracture but does not bond when under mere hydrostatic pressure (i.e., not under differential stress) in the wellbore where they may contact at elevated hydrostataic pressure but under minimal closure stress. Thus, if desired, proppant in a well bore can be removed after being in the well bore for an extended period of time at downhole conditions without differential stress.

Another potential advantage of the present invention is that it can retain it curability even after being stored at elevated natural conditions. In some parts of the world, such as the Middle East, which experience very hot weather, proppant may be stored for extended periods of time at temperatures as high as 140 degrees F. This may cause curable proppants to prematurely react during such hot storage and this would lead to losing some of the curability, and hence potential bond strength when injected downhole into a subterranean formation. In contrast, the present invention can withstand such storage such that the coated particle has a compressive strength retention of at least 80% or at least 90%, preferably at least 95%, as measured by a UCS test following 14 days of storage at 140 degrees F. Typically, the present invention can withstand such storage such that the coated particle has a compressive strength retention of at least 80% or at least 90%, preferably at least 95%, as measured by a UCS test following 28 days of storage at 140 degrees F.

IV. BRIEF DESCRIPTION OF THE DRAWING

The sole FIGURE shows a typical coated particle of the present invention.

V. DESCRIPTION OF THE PREFERRED EMBODIMENTS

The present invention provides a coated particle comprising a substrate coated with at least one resinous curable coating. The resinous curable coating may be individually selected from the group consisting of phenol-formaldehyde resins, epoxy resins, urea-aldehyde resins, furfuryl alcohol resins, melamine-aldehyde resins, polyester resins and alkyd resins. Typically, the coated particles of the invention include at least one inner layer comprising a member independently selected from the group consisting of a furan resin, a combination of furan resin and phenolic resin, or a phenol-furan-formaldehyde terpolymer resin. Furthermore, the coated particles of the invention may include at least one outer layer of resin comprising curable phenol formaldehyde novolac resin.

The present invention also provides a method to form a coated particle having only curable coatings by coating sand or other particulate substrate with at least one curable resin inner layer, and at least one curable outer layer.

A. Substrate

The particulate material used in the practice of this invention can be any of the solid materials normally used as propping agents. For example, suitable particulate material, i.e., includes sand, naturally occurring mineral fibers, such as zircon and mullite, ceramic, such as sintered bauxite, or sintered alumina, other non-ceramic refractories such as milled or glass beads. The individual particles of the particulate substrate have a particle size in the range of USA Standard Testing screen numbers from about 8 to about 100 (i.e. screen openings of about 0.0937 inch to about 0.0059 inch). Preferred substrate diameter is from about 0.01 to about 0.04 inches. Bauxite, unlike alumina, contains naturally occurring impurities and does not require the addition of sintering agents. The particles are typical proppant particles. Thus, they are hard and resist deforming. Deforming is different from crushing wherein the particle deteriorates. Moreover, the substrates do not melt at a temperature below 200° F. or 225° F., typically the substrates do not melt at a temperature below 450° F. or 550° F.

However, it is considered within the scope of the invention to additionally include deformable water-insoluble particulate material with the non-deformable water-insoluble particulate material. Such deformable particles are described below.

Additionally, it is considered within the scope of the present invention to provide the at least one curable inner coating and at least one curable outer coating, as described herein, on other particulate material, such as those used for sand control and gravel packs, where it is desired to achieve bond strength between particles under pressure.

B. Curable Resins

The curable resins used in the practice of the invention are any resin capable of being coated on the substrate in an uncured form. Examples of such resins include phenol-aldehyde resins, melamine-aldehyde resins, resole and novolac resins, urea-aldehyde resins, epoxy resins and furfuryl resins, as well as urethane resins.

The resins are to be applied in a curable state, and remain so even after addition of a curative, e.g., catalyst or crosslinking agent to induce curing.

A common test used to measure curability is the percent acetone extractables test and is described below in the section entitled Coated Proppant Parameters.

However, it must be understood that the curable state of the resin used to coat the substrate is a process parameter, not a function of the resin itself. Specifically, the temperature at which the resin is applied, in combination with the amount or concentration of curative added, can effectively determine the "curability" level of the resin.

1. Furan Resin

In one embodiment, a furan resin is used. The furan resins are the thermosetting resins made by reacting furfuryl alcohol with formaldehyde or by the self-polymerization of furfuryl alcohol, or a combination of reacting furfuryl alcohol with formaldehyde and self-polymerization.

Furfural can also be used in place of furfuryl alcohol.

Furfuryl alcohol-formaldehyde resins are produced in a process which incorporates a water soluble multivalent metal salt as the catalyst. The use of a water soluble multivalent metal salt eliminates the necessity of using a protonic acid catalyst and the reaction is carried out under essentially hydrous conditions.

The preferred source of formaldehyde is 50% formalin. However, other grades can be used. Paraformaldehyde can also be used if sufficient water is added to the reaction to maintain all or a substantial portion of the curative in solution.

Furfuryl alcohol, formaldehyde and the multivalent metal salt catalyst are simply added to a reaction vessel and heated to reaction temperature.

The water soluble multivalent metal salt catalysts which can be used in this reaction include the multivalent ions of manganese, zinc, cadmium, magnesium, cobalt, nickel, copper, tin, iron, lead and calcium. Preferred catalysts are zinc acetate, lead acetate or mixtures thereof.

In the reaction of furfuryl alcohol, formalin and the multivalent metal salt catalyst, it is desirable to remove excess water from the condensation reaction and water present in formalin in excess of the amount necessary to solubilize the catalyst. The water removal can be accomplished by distillation during the reaction and increases the rate of reaction as well as reduce the water content of the final product. Water removal can be accomplished conveniently during the reaction or at any point that facilitates processing of the product.

An important constraint on the amount of water removed during the reaction is that sufficient water be present to maintain enough multivalent metal salt in aqueous solution to catalyze the reaction between the furfuryl alcohol and formaldehyde. Undissolved catalyst is not useful to catalyze the reaction. Therefore, an adequate amount of catalyst should be present in aqueous solution to catalyze the reaction.

The mole ratio of furfuryl alcohol to formaldehyde can vary from about 3:1 to about 0.5:1, respectively, preferably about 2:1 to 1:1.

The amount of water soluble multivalent metal salt used as the catalyst can vary from about 0.2 to about 8% by weight of the furfuryl alcohol.

The reaction can be carried out at temperatures of about 85 to 105° C. at atmospheric pressure or at elevated temperatures under pressure. One of the primary concerns in carrying out the reaction at elevated temperatures and pressures is to prevent the reaction mixture from boiling. Thus, for example, if an operating temperature of 140° C. were desired, the pressure must be correspondingly elevated to prevent the reaction mixture from boiling.

The end point of the reaction can be controlled by reacting to a free formaldehyde level or to a viscosity specification. The final product can be used as is or diluted with a suitable solvent, including furfuryl alcohol or water.

Although the reaction has been described in terms of formaldehyde, other aldehydes of the general formula: R—CHO can also be used, wherein R is a hydrocarbon radical containing about 1–8 carbon atoms such as formaldehyde, acetaldehyde, propionaldehyde, furfuraldehyde, and the like. The preferred form of formaldehyde is in the hydrous state, such as formalin.

Furfuryl alcohol or substituted furfuryl alcohol compounds can be used with the formula I

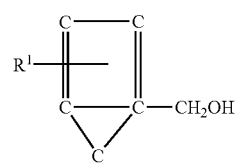

where $R^1$ can be an alkyl, aryl, alkenyl, alkylol, alkoxy, aryloxy, halogen or hydroxy radical. The preferred compound is furfuryl alcohol.

2. Combination of Furan Resin and Resole Resin

The above-discussed furan resin may be used together with resole resin. Typically the weight ratios of the furan resin to the resole resin is 9:1 to 1:9.

3. Resole Resin

The phenolic resins used in the practice of this invention are the thermosetting resins made from phenol or substituted phenols and formaldehyde or other aldehydes. The preferred substituted phenols are where either the two ortho, one ortho and the para, or the two ortho and the para positions are unsubstituted. In general, the phenols that can be used are those suitable for making phenolic resins. Phenol and formaldehyde are preferred materials. Many of the suitable phenolic resins are called "resoles", and can be in either a liquid or solid state.

A "resole" is the resin product of the partial condensation of a phenol with an aldehyde in such proportion that the partial condensate is capable of further condensation to an infusible or thermoset condition. A novolac phenolic resin can be used as a component with a resole which would result in a thermosetting phenolic system.

The phenol-aldehyde resole resin has a phenol:aldehyde molar ratio from about 1:1 to about 1:3. A preferred mode of preparing the resole resin is to combine phenol with a source of aldehyde such as formaldehyde, acetaldehyde, furfural, benzaldehyde or paraformaldehyde under alkaline catalysis. During such reaction, the aldehyde is present in molar excess. It is preferred that the resole resin have a molar ratio of phenol to formaldehyde from about 1:1.2 to 1:2.5. The resoles may be conventional resoles or modified resoles.

A typical way to make conventional resoles is to put a phenol in a reactor, add an alkaline catalyst, such as sodium hydroxide or calcium hydroxide, and aldehyde, such as a 50 weight % solution of formaldehyde, and react the ingredients under elevated temperature until the desired viscosity or free formaldehyde is achieved. Water content is adjusted by distillation.

Modified resoles are disclosed by U.S. Pat. No. 5,218, 038, incorporated herein by reference in its entirety. Such modified resoles are prepared by reacting aldehyde with a blend of unsubstituted phenol and at least one phenolic material selected from the group consisting of arylphenol, alkylphenol, alkoxyphenol, and aryloxyphenol.

Modified resole resins include alkoxy modified resole resins. Of alkoxy modified resole resins, methoxy modified resole resins are preferred. However, the phenolic resole resin which is most preferred is the modified orthobenzylic ether-containing resole resin prepared by the reaction of a phenol and an aldehyde in the presence of an aliphatic hydroxy compound containing two or more hydroxy groups per molecule. In one preferred modification of the process, the reaction is also carried out in the presence of a monohydric alcohol.

Metal ion catalysts useful in production of the modified phenolic resole resins include salts of the divalent ions of Mn, Zn, Cd, Mg, Co, Ni, Fe, Pb, Ca and Ba. Tetra alkoxy titanium compounds of the formula $Ti(OR^2)_4$ where $R^2$ is an alkyl group containing from 3 to 8 carbon atoms, are also useful catalysts for this reaction. A preferred catalyst is zinc acetate. These catalysts give phenolic resole resins wherein the preponderance of the bridges joining the phenolic nuclei are ortho-benzylic ether bridges of the general formula —$CH_2(OCH_2)_n$— where n is a small positive integer.

4. Terpolymer of Phenol, Furfuryl Alcohol and Formaldehyde

A terpolymer of phenol, furfuryl alcohol and formaldehyde can also be used in place of separate phenolic and furan resins.

A phenol-formaldehyde-furfuryl alcohol terpolymer is prepared from the catalytic reaction of phenol, formaldehyde and furfuryl alcohol, wherein the catalyst is a water soluble multivalent metal salt, and wherein the reaction is carried out under essentially hydrous conditions. The common water soluble salts of multivalent metal ions which can be used as the catalyst in the present invention are less costly than the organic solvent soluble salts at equal equivalents of metal ion that are used in the process disclosed in U.S. Pat. No. 4,255,554 to Wuskell. The use of a water soluble multivalent metal salt eliminates the necessity for controlling the reaction pH in the manner necessary with an acid catalyst. However, the multivalent metal salt catalyzed reaction must be operated at a pH of less than 7.0. When uncontaminated phenol, formalin, furfuryl alcohol and zinc or lead acetate are mixed in the proper proportions, the pH is always less than 7.0.

Thus, organic solvents are not needed to remove water, nor is an azeotropic distillation and the equipment normally associated with this type of distillation necessary. Moreover, an aqueous solution of formaldehyde, such as formalin can be used in place of paraformaldehyde, the solid low molecular weight polymer of formaldehyde. Liquid formalin is also easier to handle and less costly than paraformaldehyde.

The water soluble multivalent metal salts used as the catalysts to make this terpolymer include the multivalent ions of manganese, zinc, cadmium, magnesium, cobalt, nickel, tin, copper, iron, lead, and calcium. Preferred catalysts are zinc acetate or lead acetate, and mixtures thereof.

The terpolymer reaction can be carried out by initially reacting furfuryl alcohol and formaldehyde at temperatures of about 85° to 105° C., at atmospheric pressure, then adding phenol and continuing the reaction to a viscosity of about 100 to 10,000, preferably about 200 to 5,000 centipoises, measured at a temperature of about 25° C.

The maximum reaction temperature is determined by the boiling point of the reaction mixture at atmospheric pressure. However, the reaction can be conducted at elevated temperatures of up to about 140° C. in pressurized reaction vessels, taking care to ensure that the reaction mixture does not boil under these elevated conditions.

The reaction can also be carried out by initially reacting phenol and formaldehyde, then adding the furfuryl alcohol and continuing the reaction to a viscosity of about 100 to 10,000 cps, preferably about 200 to 5,000 cps, measured at about 25° C. Alternatively, the reaction can be carried out by reacting phenol, furfuryl alcohol and formaldehyde simultaneously in the presence of the water soluble multivalent metal salt catalysts.

The ratio of unreacted furfuryl alcohol to phenol in the final product is dependent upon the initial ratios of furfuryl alcohol to phenol, as well as the reaction method used, and this ratio can be monitored by analysis. The preferred ratio would also be influenced by the end use of the product.

It is generally desirable to remove excess water from the reaction products by distillation. The excess water is the fraction above the amount necessary to solubilize the multivalent metal salt catalyst. Excess water can be present in the formalin and also formed from the condensation reaction. Its removal can be accomplished conveniently during the reaction at any point which facilitates processing of the product. An important constraint upon the amount of water removed during the reaction is that sufficient water be present to maintain enough multivalent metal salt catalyst in aqueous solution to catalyze the reaction. Therefore, it is desirable that enough water be present to maintain substantially all of the water soluble multivalent metal salt catalyst in aqueous solution.

As already noted, the end point of the reaction can be controlled by reacting to a viscosity specification of about 100 to 10,000 centipoises at about 25° C. The resulting phenol-formaldehyde-furfuryl alcohol terpolymer can be used as is or diluted with any suitable solvent, including furfuryl alcohol or water.

The ratios of phenol, furfuryl alcohol, and formaldehyde can vary widely with respect to each other, depending upon economic considerations and performance requirements. Since furfuryl alcohol is more costly than phenol, the more phenol and less furfuryl alcohol that can be used with acceptable performance, will reduce the cost of the resin. However, the higher the furfuryl alcohol content of the cured resin, the better the resin's resistance will be to many chemicals, particularly caustic solutions. Moreover, when the resins are cured in end use applications employing an acid catalyst, resins with higher amounts of furfuryl alcohol will be more reactive.

In general, the mole ratio of phenol to furfuryl alcohol can vary from about 0.1:1 to about 10:1, respectively. The mole ratio of formaldehyde to phenol+furfuryl alcohol can vary from about 0.5:1 to 2:1, respectively in moles of $CH_2O$:phenol+furfuryl alcohol. The amount of catalyst can vary from about 0.2% to about 8% by weight of the total amount of phenol and furfuryl alcohol.

Although the reaction has been described in terms of formaldehyde, other aldehydes of the general formula: R—CHO can also be used, wherein R is a hydrocarbon radical containing about 1–8 carbon atoms such as acetaldehyde, propionaldehyde, furfuraldehyde, and the like. The preferred form of formaldehyde is in the hydrous state, such as formalin.

Furfuryl alcohol or substituted furfuryl alcohol compounds can be used with the formula II:

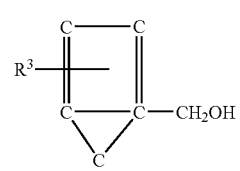

II where $R^3$ can be an alkyl, aryl, alkenyl, alkylol, alkoxy, aryloxy, halogen or hydroxy radical. The preferred compound is furfuryl alcohol.

In addition, although phenol is the preferred phenolic reactant, other substituted phenols can also be used, especially those phenols having the formula III:

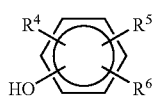

III wherein $R^4$, $R^5$ and $R^6$ can independently be hydrogen, hydrocarbon radicals, oxyhydrocarbon radicals, hydroxy radicals or halogen, and substituted such that either the two ortho, one ortho and the para, or the two ortho and the para positions are unsubstituted. In general, the phenols that can be used are those which are suitable for making phenolic resins. Some examples are o-cresol, m-cresol, p-cresol, octyl phenol, nonyl phenol, 3,5-dimethoxy phenol, p-tert-butylphenol, p-butoxyphenol, resorcinol, 3,5-xylenol, 3-5-diethylphenol, catechol, 3,5-dibutylphenol and the like.

After being applied as coatings, these terpolymers may be cured with curatives such as acid catalyst such as ammonium chloride or ammonium sulfate.

5. Phenol-Aldehyde Novolac Polymer-Containing Resins

In at least one embodiment, the at least one outer coating of particles of the present invention may comprise curable phenol-aldehyde novolac polymer. The novolac may be any novolac employed with proppants. The novolac may be obtained by the reaction of a phenolic compound and an aldehyde in a strongly acidic pH region. Suitable acid catalysts include the strong mineral acids such as sulfuric acid, phosphoric acid and hydrochloric acid as well as organic acid catalysts such as oxalic acid, or para toluenesulfonic acid. An alternative way to make novolacs is to react a phenol and an aldehyde in the presence of divalent inorganic salts such as zinc acetate, zinc borate, manganese salts, cobalt salts, etc. The selection of catalyst may direct the production of novolacs which have various ratios of ortho or para substitution by aldehyde on the phenolic ring, e.g., zinc acetate favors ortho substitution. Novolacs enriched in ortho substitution, i.e., high-ortho novolacs, may have greater reactivity in further cross-linking for polymer development. High ortho novolacs are discussed by Knop and Pilato, *Phenolic Resins*, p. 50–51 (1985) (Springer-Verlag) incorporated herein by reference. High-ortho novolacs are defined as novolacs wherein at least 60% of the total of the resin ortho substitution and para substitution is ortho substitution, preferably at least about 70% of this total substitution is ortho substitution.

The novolac polymer typically comprises phenol and aldehyde in a molar ratio from about 1:0.85 to about 1:0.4. Any suitable aldehyde may be used for this purpose. The aldehyde may be formalin, paraformaldehyde, formaldehyde, acetaldehyde, furfural, benzaldehyde or other aldehyde sources. Formaldehyde itself is preferred.

The novolacs used in this invention are generally solids such as in the form of a flake, powder, or other small particulate form. The molecular weight of the novolac will vary from about 500 to 15,000, typically from about 500 to about 10,000, from about 1,000 to 5,000 or from about 5,000 to 10,000, depending on intended use. The molecular weight of the novolacs in this description of the present invention is on a weight average molecular weight basis.

The outer coating resin composition typically comprises at least 10 weight percent novolac polymer, preferably at least about 20 weight percent novolac polymer, about 50 to about 70 or about 85 to about 95 weight percent novolac polymer. Preferably, the hexa levels used, based on the amount of novolac, on the topcoat, or outermost novolac resin layer, are selected to cause a low crosslink density such that the material maintains its resiliency that enables the resin coated substrate to exhibit resistance to failure under cyclic stress and retain a high level of bonding capability, even after subjected to aqueous slurries at high temperature for extended periods of time.

The remainder of the coating composition could include crosslinking agents, modifiers or other appropriate ingredients.

The phenolic moiety of the novolac polymer is selected from phenols of Formula IV or bisphenols of Formula V, respectively:

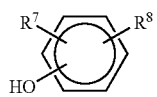

IV

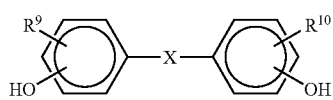

V $R^7$ and $R^8$ of Formula IV, are independently alkyl, aryl, arylalkyl or H. In Formula V, $R^9$ and $R^{10}$ are preferably meta to the respective hydroxy group on the respective aromatic ring. Unless otherwise defined, alkyl is defined as having 1 to 6 carbon atoms, and aryl is defined as having 6 carbon atoms in its ring. In Formula V, X is a direct bond, sulfonyl, alkylidene unsubstituted or substituted with halogen, cycloalkylidene, or halogenated cycloalkylidene. Alkylidene is a divalent organic radical of Formula VI:

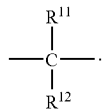

VI

When X is alkylidene, $R^{11}$ and $R^{12}$ are selected independently from H, alkyl, aryl, arylalkyl, halogenated alkyl, halogenated aryl and halogenated arylalkyl. When X is halogenated alkylidene, a halogen atom replaces one or more of the hydrogen atoms of the alkylidene moiety of Formula. Preferably the halogen is fluorine or chlorine. Also, halogenated cycloalkylidene is preferably substituted by fluorine or chlorine on the cycloalkylidene moiety.

A typical phenol of Formula IV is phenol, per se.

Typical bisphenols of Formula V include Bisphenol A, Bisphenol C, Bisphenol E, Bisphenol F, Bisphenol S, or Bisphenol Z. Additional bisphenols, suitable for use as coating resins are those disclosed by U.S. Pat. No. 5,639,806, herein incorporated by reference in its entirety.

The present invention includes novolac polymers which contain any one of the phenols of Formula IV, bisphenols of Formula V, or combinations of one or more of the phenols of Formula IV and/or one or more of the bisphenols of Formula V. The novolac polymer may optionally be further modified by the addition of VINSOL® resin from Hercules, Inc., Wilmington, Deleware, epoxy resins, bisphenol, waxes, or other known resin additives. One mode of preparing an alkylphenol-modified phenol novolac polymer is to combine an alkylphenol and phenol at a molar ratio above 0.05:1. This combination is reacted with a source of formaldehyde under acidic catalysis, or divalent metal catalysis (e.g., Zn, Mn). During this reaction, the combination of alkylphenol and phenol is present in molar excess relative to the formaldehyde present. Under acidic conditions, the polymerization of the methylolated phenols is a faster reaction than the initial methylolation from the formaldehyde. Consequently, a polymer structure is built up consisting of phenolic and alkylphenolic nuclei, linked together by methylene bridges, and with essentially no free methylol groups. In the case of metal ion catalysis, the polymerization will lead to methylol and benzylic ethers, which subsequently break down to methylene bridges, and the final product is essentially free of methylol groups.

To make phenolic novolac polymers with one or more phenols of Formula IV, the phenol is mixed with acidic catalyst and heated. Then an aldehyde, such as a 50 weight % solution of formaldehyde is added to the hot phenol and catalyst at elevated temperature. Water made by the reaction is removed by distillation to result in molten novolac. The molten novolac is then cooled and flaked.

To make novolac polymers with bisphenols of Formula V, the bisphenol is mixed with a solvent, such as n-butyl acetate, at elevated temperature. An acid catalyst such as oxalic acid or methane sulfonic acid is then added and mixed with the bisphenol and then an aldehyde, typically formaldehyde, is added. The reactants are then refluxed. It is noted that the preparation of the novolac resin can occur under acidic catalysis, or divalent metal catalysis (e.g., Zn, Mn), wherein the bisphenol is present in greater than equimolar amount relative to the source of aldehyde. After reflux, water is collected by azeotropic distillation with n-butyl acetate. After removal of the water and n-butyl acetate, the resin is flaked to yield resin products. Alternatively, the polymers can be made using water as a solvent.

C. Crosslinking Agents and Other Additives

For practical purposes, phenolic novolacs do not harden upon heating, but remain soluble and fusible unless a hardener (curative, or crosslinking agent) is present. Thus, in curing a novolac resin, a crosslinking agent is used to overcome the deficiency of alkylene-bridging groups to convert the resin to an insoluble infusible condition.

However, the level of curative used in accordance with this invention is preferably substantially less than that which is used to form conventional curable proppants or conventional pre-cured proppants. Specifically, in conventional proppants including curable coatings, an excess of curative is provided, such that the crosslinking or setting of the resin continues as long as the temperature remains elevated. Thus, temperature determines the total degree of cure. In this invention, the level of curative is preferably limited such that despite the temperature of the resin, i.e., novolac, the resin cannot cure beyond a predetermined amount. Thus, the curative is a limiting reagent. This distinction provides the coated proppants of this invention with resiliency that enable the resin coated substrate to exhibit resistance to failure under cyclic stress and retain a high level of bonding capability, even after subjected to aqueous slurries at high temperature for extended periods of time.

Appropriate crosslinking agents include hexamethylenetetramine (hexa), paraformaldehyde, oxazolidines, melamine resin or other aldehyde donors and/or phenol-aldehyde resole polymers. Each of these crosslinkers can be used by itself or in combinations with other crosslinkers. The resole polymer may contain substituted or unsubstituted phenol, as long as the amount of crosslinker (i.e., the amount of aldehyde donation) and the temperature at which it is added to the coating are controlled.

The outer coating composition of this invention typically comprises up to about 25, typically from about 1 to about 5, weight percent hexa and/or up to about 95, typically not less than 70 weight percent novolac polymers based on the total weight of the composition for each particular layer of outer coating. Where hexa is the sole crosslinking agent, the hexa comprises from about 1 to about 25, for example from about 1 to about 5, weight percent of the resin for this particular layer. Where the phenol-aldehyde resole polymer is the sole crosslinking agent, the resin of this particular layer contains from about 20 to about 90 weight percent of the resole polymer. However, in another embodiment the resole polymer may be present from about 5 to about 50%, by weight. The composition may also comprise combinations of these crosslinkers.

Typically, hexa is provided in an aqueous solution having a high water content, such as 3–20% hexa. A high water percentage, i.e., 80–97%, is included to both help distribute the hexa and control the reaction. Specifically, the water serves as a heat sink to absorb excess heat to quench the crosslinking reaction. Accordingly, the hexa concentration may be adjusted to modify the final temperature and level of cure. For example, if an elevated final temperature is desired, such as will be used for additional coating applications, it may be desirable to increase the hexa concentration (to lower the water volume) to limit the amount of quenching performed by the water.

Additives are used for special cases for special requirements. The coating systems of the invention may include a wide variety of additive materials. The coating may also include one or more other additives such as a coupling agent (such as a silane) to promote adhesion of the coating to substrate, a silicone lubricant, a wetting agent, a surfactant, dyes, flow modifiers (such as flow control agents and flow enhancers), reinforcements (such as fibers), and/or antistatic agents. The surfactants may be anionic, nonionic, cationic, amphoteric or mixtures thereof. Certain surfactants also operate as flow control agents. Other additives include humidity resistant additives or hot strength additives. Of course, the additives may be added in combination or singly.

Another potential additive is one or more thermoplastic elastomers present on or in at least one coating, in an amount sufficient to improve the dust suppression and/or crush resistance of the particle above that which would occur if the thermoplastic elastomer was absent. Information on the use of thermoplastic elastomer with proppants is disclosed in U.S. provisional patent application Ser. No. 60/462,694, filed Apr. 15, 2003, incorporated herein by reference in its entirety.

The use of organofunctional silanes as coupling agents to improve interfacial organic-inorganic adhesion is especially preferred. These organofunctional silanes are characterized by the following formula VII:

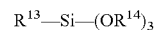
$$R^{13}\!-\!Si\!-\!(OR^{14})_3 \qquad\qquad VII,$$

where $R^8$ represents a reactive organic function and $OR^{14}$ represents a readily labile alkoxy group such as $OCH_3$ or $OC_2H_5$. Particularly useful for coupling phenolic or furan resins to silica are the amino functional silanes of which Union Carbide A1100 (gamma aminopropyltriethoxysilane)

is an example. The silane can be premixed with the resin or added to the mixer separately.

It is desirable to add the lubricant to the mix at some point after the catalyst or hexa is added and before the product "breaks down" into free flowing particles. For example, in an embodiment comprising two furan/resole inner layers, the catalyst for the furan/resole inner layer may comprise an ammonium chloride solution that may be added after each of the two layers of furan/resole. Thus, each layer is allowed to advance to a partially cured condition. After the phenolic novolac is added as a third layer, hexa may be added to partially cure this layer.

The lubricant is preferably one that is liquid at the mixing temperature and has a sufficiently high boiling point so that it is not lost during the mixing process. Suitable lubricants include liquid silicone such as Dow Corning Silicone 200, mineral oil, paraffin wax, petrolatum, cocamidopropyl-hydroysultaine (Chembetatine CAS from Chemron Corp., Paso Robles Calif., or the synthetic lubricant Acrawax CT, a bis-stearamide of a diamine, available from Glyco Chemicals, Inc., Greenwich, Conn.). The amount of lubricant can vary from about 0.01 or 0.03% to about 0.5% by weight based upon the weight of the particulate material.

The reinforcements may be any number of materials, including natural and synthetic fibers including fiberglass or other mineral types or phenolic fibers or other organic types. Information on the use of reinforcements is also disclosed in U.S. provisional patent application Ser. No. 60/462,694, filed Apr. 15, 2003, incorporated herein by reference in its entirety.

The thermoplastic elastomers comprise at least one elastomeric, typically thermoplastic, polymer or copolymer component which is typically amorphous and/or semi-crystalline. If the polymers and copolymers have an amorphous portion, the amorphous portion has a glass transition temperature of less than 50 or less than 25 or less than 0 or less than minus 25 degrees C. If the polymers and copolymers have a semi-crystalline portion the semi-crystalline portion preferably has a melting point from 40 to 80 degrees C., e.g., 60 degrees C.

An example of a thermoplastic amorphous polymer that is syrup at room temperature is HYCAR material.

A preferred semi-crystalline polymer is a member of the ENABLE family of products available as particles (or pellets) having an equivalent diameter of about 0.125 to 0.25 inches and having a melting point in the range from about 58 to 80 degrees C. and available from ExxonMobil Chemical Co. For example, ENABLE EN 33900 (also known as ENBA) and ENABLE EN 33330 are ethylene n-butyl acrylate copolymers in the ENABLE family.

Such thermoplastic elastomers are typically polymers and copolymers based on units derived from ethylenically unsaturated monomers selected from at least one member of the group consisting of (alkenes such as ethylene and propylene), C1–C12 alkyl (meth)acrylates, (meth)acrylonitriles, alpha-olefins, butadiene, isoprene, ethylenically unsaturated siloxanes, anhydrides, and ethers. In the present specification the term (meth)acrylates encompasses acrylates or methacrylates and the term (meth)acrylonitrile encompasses acrylonitrile or methacrylonitrile.

Typical thermoplastic elastomers comprise at least one polymer selected from the group consisting of C1–C8 alkyl (meth)acrylate polymers; copolymers of C1–C8 alkyl(meth) acrylates with monomers such as ethylene, styrene, and (meth)acrylonitrile; butadiene homopolymers; and butadiene-acrylonitrile copolymers with functionality at their chain ends. Examples of functional groups for the butadiene-acrylonitrile copolymers are carboxyl (COOH), methacrylate vinyl, amine (NH or $NH_2$), or epoxy. While not being limited to any particular theory, it is believed by the inventors that when employed in the present invention, the functional groups will react with the resin molecules.

Preferred thermoplastic elastomers comprise at least one member selected from the group consisting of butyl acrylate polymer, copolymers of butyl acrylate with other acrylates, ethylene, ethyl acrylate, or 2-ethylhexyl acrylate. For example, a preferred thermoplastic elastomer is ethylene-n-butyl acrylate copolymer optionally blended with n-butyl acrylate or other thermoplastic polymers. Other preferred thermoplastic elastomers comprise at least one member selected from the group consisting of carboxy terminated butadiene-acrylonitrile copolymer, methacrylate vinyl terminated butadiene-acrylonitrile copolymer and amine terminated butadiene-acrylonitrile copolymer. The molecular weight of the thermoplastic elastomers may be controlled by use of chain transfer agents, such as alkyl mercaptans.

The thermoplastic elastomers are added as liquids, dispersions of fine particles, or dry particles or pellets.

For embodiments of particles including resin coated substrate, the amount of thermoplastic elastomer generally varies between 0.25 and 50 parts, between 0.25 and 20 parts, typically between 0.25 and 10 parts, or between 0.25 and 5 parts, or between 0.5 and 2.5 parts, based on 100 parts thermosetting resin. Typically, for embodiments having about 1 to 8% resin, the particle contains about 0.005 to 4.0, or about 0.005 to 2.0, weight percent of the thermoplastic elastomer based upon weight of the particle. Typically, the thermoplastic elastomer is added simultaneously or after the resin it is modifying. For example, the thermoplastic elastomer may be added 0 to 5 minutes, or 1 to 3 minutes, after the resin.

D. Reacting Aldehyde with Phenol-Aldehyde Novolacs or Bisphenol-Aldehyde Novolacs Phenol-aldehyde novolacs or bisphenol-aldehyde novolacs may be modified by reacting these novolacs with an additional quantity of aldehyde using a basic catalyst. Typical catalysts used are sodium hydroxide, potassium hydroxide, barium hydroxide, calcium hydroxide (or lime), ammonium hydroxide and amines.

In the case of phenol-aldehyde polymers or bisphenol-aldehyde polymers, the molar ratio of added aldehyde to phenolic moiety, based on the phenolic moiety monomeric units in the novolac, ranges from 0.4:1 to 3:1, preferably from 0.8:1 to 2:1. This achieves a crosslinkable (reactive) polymer having different chemical structures and generally higher molecular weights than the resole polymers obtained by a single step process which involves initially mixing bisphenol monomers and aldehyde with an alkaline catalyst at the same molar ratio of the combined aldehyde and bisphenol. Furthermore, it is feasible to use different aldehydes at different stages of the polymer preparation.

These aldehyde-modified polymers are useful in coating compositions for oil field proppants and foundry sands. These polymers can be used alone as a coating. These polymers can also be used with other polymers, such as phenol-aldehyde novolacs, bisphenol-aldehyde novolac, or combinations thereof, as a crosslinking agent, or as a component of crosslinking agents. When the aldehyde-modified polymers are employed as crosslinking agents, they may be used with other typical crosslinking agents such as those described above for novolac polymers.

E. Method to Make Coated Particles

The appropriate resin (or resins), the curative, and particulate material are mixed at conditions to provide a curable coating composition. Whether a coating composition is of the precured or curable type depends upon a number of parameters. Such parameters include the ratio of the resin to the curing agent; the acidity of the novolac resin; the pH of the resole resin; the amount (and concentration) of the crosslinking agent; the time of mixing the coating compositions and particles; the temperature of the coating compositions and particles during mixing; catalysts used during the particle coating; and other process parameters as known to those skilled in the art.

Typically, the resin is coated onto particulate material by a hot coat process. The hot coat process includes adding the resin to sand (or other particulate material), the sand having been heated in a standard sand heater, to a temperature above the melting point of the resin, but not high enough to cause the resin to fall apart or thermally degrade. Thereafter, the sand is removed from the heater and is placed in a mixer. Because no additional heat is applied, the temperature of the sand when leaving the heater must be high enough, such that the final coat(s) may be applied. Additionally, the temperature must be low enough, such that the rate of cure is capable of being accurately controlled. Once the first resin has completely coated the particulate material (typically 30–60 seconds), a curative is added, and the ingredients are stirred for the desired time to produce a particulate material coated with a curable resin. While a coverage of 100% is desired, it is considered within the scope of the invention to add the curative when the resin has only covered about 99.5%. In one embodiment, the level of coverage can be determined by simple observation. If the liquid resin is inherently colored, or otherwise includes a dye, the degree of coverage of the particulate material by the liquid resin can by measured by watching the migration of the color of the resin. Typically, the mixing occurs in the presence of a coupling agent such as an organosilane and a lubricant, such as a silicone fluid, such as L-45 manufactured by Dow Corning Corporation, Midland, Mich. (materials of this type are discussed in U.S. Pat. No. 4,439,489 to Johnson, et al., herein incorporated in its entirety).

For example, the sand is heated to a temperature in a range from about 225 to 550° F., more typically in a range from about 350 to 550° F., 400 to 550° F., 400 to 530° F., 400 to 450° F. or 400 to 410° F., and removed from the heater, and placed in a mixer. Then, the first resin is added to the heated sand, and the resin is allowed to coat the sand by mixing at a temperature in the range from about 225 to the initial temperature of the resin substrate mixture, for example about 225 to 450° F. or about 300 to 410° F. Then, the curative is added. Typically, the particulate material, having a partially cured coating, has dropped to about 300 to 380° F. or 330 to 380° F., following the application of the first coating. If additional layers of the first coating are to be applied, a temperature drop of between about 30–40° F. can be expected. Multiple layers of the inner coating are used to smooth or "round off" the generally irregular shape of the sand or other particulate matter. Multiple layers of the curable resin are desired because the jagged or otherwise irregular surfaces on the particulate material itself may cause problems in a consolidated proppant pack.

Once the final layer of the first resin has been applied, the second resin can be applied. Typically, the coated particulate material is at a temperature of about 300 to 320° F. at this step. However, this temperature can be adjusted, along with the amount/concentration of curative to modify the desired degree of cure. In one embodiment, the novolac resin, as described above, is applied as a flake and must be melted in order to cover the coated particulate material. Then, the crosslinking agent may be applied.

The temperature during the coating process relies upon the original temperature of the particle. Because no other heat is applied, the system continues to drop in temperature during application of each subsequent layer because of process conditions, such as the melting or boiling off water. Preferably, however, the temperature is maintained to (1) not over-convert the reactive mixture and (2) yet still be hot enough to melt the novolac and boil off the water and other volatiles to recover a dry product. For example, when the particle has been preheated to 410° F., the coating process can be completed and the coated product discharged at a temperature of about 250° F.

In the multiple resin coating process, the amount of resin used to coat the particulate matter will generally vary from about 1–8% and preferably about 2–4% by weight of the particulate matter. The incremental amount of resin, used to form each of the inner or outer coating layer(s), should be sufficient to form a substantially continuous coating on the entire surface of the particle. For certain applications, this amount can be about 10% by weight of the total amount of resin, leaving the remaining 90% of the total amount of resin as one or more increments or layers of the same material to be applied in any number of additional applications. Preferably, any one increment should not exceed about 70%, and most preferably not exceed about 50% or 30% by weight of the total amount of resin. In the present invention, ratios of the layers of curable resole:curable resole:curable novolac are not critical and the performance should be relatively tolerant of wide swings in the quantities occupying each layer.

Finally, although the coated particle of the invention may include two curable layers, e.g., a single inner layer and a single outer layer, it is considered within the scope of the invention to provide more than one layer for the inner layer and/or the outer layer. The different inner layers are provided by applying the uncured resin for the inner layer and thereafter, adding the catalyst or crosslinking agent thereto. Only after the resin has completed its partial cure, is a second application of the uncured resin added. Because the temperature of the heated particle is constantly falling during application of the first and second layers, the temperatures at which each of the individual layers forming both the layers will have therein, different levels of cure. Specifically, because cure rate and amount are directly related to the temperature and amount of crosslinking agent, the layers added after the first will necessarily be at lower temperatures. However, as described above, the reaction conditions may be modified to achieve the same degree (and rate) of cure, despite a lower temperature. The resulting coated particle (in particular its coatings) resist melting at temperatures below about 200° F. or below about 225° F.

An embodiment comprising furan/phenol-resole-formaldehyde resin coatings and a novolac resin coating The sole FIGURE shows a proppant particle 10 comprising a substrate particle 20, a first curable 30, a second curable furan/phenol-resole-formaldehyde resin coating 32, and a third curable novolac resin coating 34. For each layer, the appropriate resin, crosslinking agent, and substrate particle 20 are mixed to produce the proppant 10. The proppant 10 is prepared such that the total weight of the coatings is from about 1 to about 8 weight percent of the weight of the coated proppant. The particle 20 has a pre-coated size in the range of USA Standard Testing screen numbers from about 8 to about 100.

In a first embodiment for making a particle of the sole FIGURE, each of the first and second curable inner coating comprises a mixture of furan resin and phenolic resole resin (which can form a terpolymer of furfuryl alcohol, formaldehyde, and phenol), while the outer coating comprises a curable novolac. Low to moderate levels of acid catalyst, e.g., ammonium chloride or ammonium sulfate, are used to effect a partial cure for the resole cure, and low to moderate levels of dilute hexa are used to partially cure the novolac. The temperature and other process conditions are selected to avoid over curing the coatings. If desired, a furan resin (or a terpolymer of phenol, furfuryl alcohol and formaldehyde) could be employed for the inner layers.

The preferred catalyst for each layer of furan, or physical or chemical combination of furan and resole, comprises ammonium chloride. Another typical catalyst comprises ammonium sulfate. The amount of catalyst used can vary widely depending on the type of catalyst used, type of resin used, mixing temperature and type of mixer. In general, the amount of catalyst solids can range from about 0.05% to 10%, such as 0.2% to 10% or 0.05–0.25%, based on the weight of the resin. Typically, ammonium chloride 1–5% in water, and at a level of 0.05–0.25% on a solids basis based on the weight of the furan/phenol/formaldehyde terpolymer is used in the first two coatings. For example, when 2.5% ammonium chloride solution in water is used, 5% of this solution may be used based on terpolymer weight.

Substantially cured resin has less than 5 wt. % acetone extractables. Substantially curable has more than 5 wt. % acetone extractables.

The amount of curative preferably employed is less than 50% of the amount to substantially cure the resin, in other words, to produce a resin having 5% acetone extractables when the curative is exhausted, i.e., fully consumed. The amount of curative more preferably employed is less than 25% of the amount to substantially cure the resin, in other words, to produce a resin having 5% acetone extractables when the curative is exhausted, i.e., fully consumed. The amount of curative most preferably employed is less than 10% of the amount to substantially cure the resin, in other words, to produce a resin having 5% acetone extractables when the curative is exhausted, i.e., fully consumed.

Hexa, used to partially cure the novolac, is typically aqueous hexa (4–12%) for which the solid hexa is used at a level of 1–5% based on the novolac weight or 0.2–1% of the total coating weight (novolac and resole combined).

The particulate matter is preheated to a temperature in the range from about 350° to 550° F., typically 350° to 450° F. or 400° to 410° F. The particulate matter is resistant to melting at these temperatures. Then a first addition or incremental amount of the uncured thermosetting phenolic resole resin and uncured thermosetting furan resin is added to the preheated particulate matter, while the particulate matter is being mixed, to individually coat the particles with a curable combination of phenolic and furan resin. The mixing of the particulate matter with the first addition of resin occurs at temperatures of at most about 550° F., typically 350–450° F. or 400–410° F. In particular, the temperature must be high enough to adequately distribute the resin across the particulate material without disrupting the structure of the resin and limiting cure. Then the required amount of curative is added to the mix to partially cure the resin. As mixing is continued at elevated temperature, the resin partially cures on the particulate matter to produce a free flowing product comprised of individual particles coated with the first inner coating of curable resin. During mixing the temperature drifts down from the original starting temperature of the particles. Thus, it is theorized that the temperature is about 300 to 380° F. or typically 330–350° F. after the first coating.

After the first portion of resin has sufficiently partially cured and the mix breaks down into free flowing particles, a second addition of resin is added to the previously coated particulate material followed by a second addition of curative. Mixing is continued at a temperature of from about 250 to 330° F. until the second addition of resin partially cure and the particulate material again breaks down into free flowing particles. Thus, a curable second inner coating is applied to the once coated-particulate matter at the temperature and catalyst concentration conditions in the ranges described above for applying the first coating to individually coat the particles with a second coating of the curable combination of phenolic resin and furan resin to form an intermediate coated particulate product having two curable inner coatings. Additional curable inner coatings may be applied if desired by repeating the coating steps.

Then, to apply the outer coating, the intermediate coated particulate product at temperatures at most about 410° F., typically about 300–410° F., is mixed with the second curable resin, e.g., molten novolac, and an appropriate curative, e.g., hexamethylenetetramine, formalin, paraformaldehyde, oxazolidines, phenol-aldehyde resole polymer and mixtures thereof. It is believed that temperature of the particles is closer to 300° F. when this topcoat is applied. The novolac and/or hexa are mixed with the intermediate coated particulate product in a molten form. Typically, the novolac and/or hexa are provided in the form of a flake and simply melt at the temperature of the particles. (Coating with novolac will be discussed in more detail below). As mixing is continued, the resin forms the curable outer coating on the particulate matter to produce a free flowing product comprised of individual particles coated with the partially cured resin. As described above, typically, hexa is supplied as an aqueous solution of 4–12%. It is also desirable to add a lubricant such as L45 silicone poly dimethoxy silicone manufactured by Dow Corning Corporation, Midland, Mich. and/or coupling agents such as A1100 silane, to the mix at some time after the last hexa addition and before the mix "breaks down".

Ingredients and steps and conditions may be modified to utilize lower levels of acid catalyst, i.e., ammonium chloride or ammonium sulfate, the resole cure and lower levels of dilute hexa to cure the novolac. Thus, in this embodiment higher temperatures may be employed with the same degree of cure achieved. For example, if the proppant were to be heated to a temperature of greater than 500° F., e.g., 530° F., the acid catalyst used to partially cure the furan resin layer(s) could be reduced to between 0.01–0.05%, by weight, based on resin weight, and the hexa concentration may be reduced to a 1–2 or 1–4% solution. Thus, the hexa concentration is reduced and the amount of hexa used (weight based on resin weight) is reduced.

Although it is described above to admix catalyst to resin for each inner coating, the inner coatings comprise a curing catalyst incorporated into or premixed with the resin of the inner coatings or added to the mixer after the resin for each inner coating has been added and coated on the proppant. A typical method is to add the curatives to the mixer after the resin has been coated. The curative can be used as is or dissolved in water or other suitable solvent system depending on the catalyst. A strong acid catalyst must be diluted with water to prevent localized reaction of the catalyst with the resin before the catalyst has had a chance to mix with the resin. Solid catalysts that do not melt below the mixing temperature are preferably used in aqueous solution. Likewise, hexa may be added to or mixed with the resin of the outer coating at various times. Additionally, if provided in a liquid solution, the amount of solvent, irrespective of curative concentration, can be used to modify or otherwise control the expected final temperature. For example, when a typical 4–12% aqueous hexa solution is used to partially cure an outer novolac resin layer, the final temperature is significantly reduced, such that the coated substrate only maintains enough heat to cure a few additional layers. The relatively dilute hexa solution contains enough water to effectively quench the curing reaction as the temperature is quickly decreased. The excess water simply absorbs the heat and is driven off. By adjusting the amount of solvent present, it is possible to further control the degree and rate of cure.

F. Coated Particle Parameters

The following parameters are useful when characterizing coated particles of the present invention.

1. Compressive Strength Test

Compressive strength of curable proppants is defined as that measured according to the following procedure, known as the Unconfined Compressive Strength or UCS test. In this test, a 2 weight percent KCl solution (doped with a small amount of detergent to enhance wetability) is added to proppant. The KCl solution and proppant (about 12 lbs. proppant per gallon KCl) are gently agitated to wet the proppant. Remove entrained air bubbles if any. If necessary use a wetting agent to remove the bubbles. This slurry (~100–200 gms depending on density) is transferred into duplicate 1.25 inch OD×10 inch stainless steel cylinders, equipped with valves on the top and bottom to bleed liquid and gas pressure as required, a pressure gauge reading 0–2000 psi, and a floating piston to transfer pressure to the sample. Typically at least 3, preferably at least 6 specimen molds are loaded to give a length greater than two times the diameter of the finished slug. The bottom valve is opened during the application of stress, allowing fluid to drain from the slurry, and then closed during the application of temperature. The cylinder is connected to a nitrogen cylinder and 1000 psi is imposed on the cylinder, transmitted by the sliding pistons to the sample, and then top valve is shut and bottom valve remains open. As test temperature is approached near to the fluid valve on the mold, the bottom (fluid valve) is closed. (Closing the fluid valve too soon may generate enough pressure, as the cell is heating, to prevent/reduce the intended closure stress applied to the proppant slug. Closing the valve too late may allow loss of too much fluid from the slug by evaporation or boiling.)

The duplicate cylinders containing the sample are transferred to an oven preheated to the desired setpoint, i.e., 250±1° F., and remain in the oven for 24 hours. Maintain stress and temperature during the cure time. Stress should be maintained ±10%. During the curing process in the oven, loose curable proppant particles become a consolidated mass. At the end of the 24 hours, the cylinders are removed, venting off pressure and fluid rapidly, and the approximately one inch by six inch consolidated slug sample is pressed from the cylinder. The sample is allowed to cool and air dry for about 24 hours, and cut (typically sawed) into compression slugs of length×diameter (L×D) of at least two x one, preferably about 2.5:1. Air drying is performed at a temperature of less than about 49 degrees C. (120 degrees F.).

Typically, both ends of each slug are smoothed to give flat surfaces and the slugs are cut to maintain a greater than 2:1 ratio of length:diameter.

The compression slugs are mounted in a hydraulic press and force is applied between parallel platens at a rate of about 4000 lbs$_f$/minute until the slug breaks. For slugs with compressive strength less than 500 psa, use a loading rate of 1000 lbs$_f$/minute. The force required to break the slug is recorded, replicates are documented, and the compressive strength for each sample is calculated using the formula below. An average of the replicates is used to define the value for this resin coated proppant sample.

$$(Fc, \text{psi}) = 4 \times Fg / \{(p \times d \times d)[0.88 + (0.24 d/h)]\}$$

wherein
Fc=compressive strength (psi)
Fg=hydraulic gauge reading (lb force)
p=pi (3.14)
d=diameter of the slug (inches)
h=length of slug (inches)

Compressive strength of the slugs is determined using a hydraulic press, i.e., Carver Hydraulic Press, model #3912, Wabash, Indiana.

Typical compressive strengths of proppants of the present invention range from 50 to 3000 psi or higher. However, the reproducibility of the UCS test is probably ±10% at best. Typically, the individual resinous layers of the invention have UCS strengths greater than 500 psi, as detailed below.

2. Rebonding Test

The Rebonding Test employs slug samples already tested for UCS performance (without being subjected to the Slurry Test), by breaking down the samples into individual particles by repeated abrasion across a metal screen (about 20 mesh), screening the resulting particles to isolate a desired size range (i.e. 20/40 mesh), and then resubmitting the individual particles to UCS tests again. The UCS values are determined and compared to the original strength values documented for this particular resin coated proppant. Rebond strength is reported as a percentage of the UCS after rebonding as compared to the sample's original UCS. Desirably the percentage UCS after rebonding is greater than about 5%, preferably greater than about 10%, typically about 5 to 15%, of the initial UCS. Desirably the coated particle has a rebonding strength of at least a 50 psi compressive strength.

3. Acetone Extraction Test

Acetone Extraction Test is another method to determine if a coating or coatings are curable. The acetone extraction method dissolves the fraction of resin that is uncured. This test is performed by placing a dried pre-weighed sample, about 50 grams, of resin coated particles (with a known resin coating content) in a Soxhlet thimble and refluxing acetone condensate over the material for 2 hours. After drying the treated sample, the change in resin content is reported as percent acetone extractables. Specifically, because uncured resin is soluble in acetone, and cured resin is not soluble in acetone, the acetone condensate reflux will remove only the uncured fraction. By weighing the sample both before and after acetone reflux and determining a percentage change, the degree of cure is calculated.

For example, typical cured resins have a change in weight often less than 0.2 grams (for a 50 gm sample tested), for an acetone extractable percentage of less than 5%. In contrast, the uncured resins used in the invention show a change in weight often greater than 2.0 gms. Thus, proppants having multiple layers of resins being used in the present invention generally exhibit overall, or if desired per layer, acetone extractable percent levels greater than about 15%, e.g., about 15 to 50% or about 15 to 30% to about 15 to 45%, while "precured" resins have acetone extractable percentages often less than 5%. When each resinous layer used in the invention is curable, the acetone extractable percentage is to be determined following the addition of the curative, and prior to application of any additional resins atop the partially cured.

4. Temperature Stick Point Test

Temperature Stick Point Test is another indicator of whether a coating is curable. It is performed by placing coated material on a heated melt point bar and determining the lowest temperature at which the coated material sticks. A "sticking temperature" of greater than 350° F. at the hottest end of the bar, typically indicates a cured material, depending upon the resin system used. The melt point bar is a brass metal bar (18 inches long and 2 inches wide) with an electric heating element at one end. Therefore, a temperature gradient can be established across the length of the bar and the temperature across the bar is monitored with thermometers or thermocouples. Using a funnel, a uniform strip of resin coated substrate, e.g., sand, is laid on the heated bar and cured for 60 seconds. Then the bar is tipped to allow any uncured proppant to fall off. Melt point is the lowest temperature at which the resin coated sand forms a continuous mass and does not fall from the bar once it is tipped to ninety degrees. Typically, the cured coating has a sticking temperature in the range from about 200 to about 300° F., for example about 200 to about 250° F.

5. Percent Crush Test

The percent crush test determines the strength of the proppant pack. Coated particulate material, in a sieve range of 20/40 mesh are selected and weighed. The sample is then pressed in a crush cell at 10,000 psi for three minutes. The press is removed and the sample is poured onto the same 20/40 screen. The fraction that falls through the bottom, 40 mesh screen is weighed and compared to the first weight. The percent crush is equal to the weight of the fraction to the weight of the sample prior to the pressing. Typical coated proppants of the invention exhibit a percent crush between about 2 and 10%. This procedure is also described in American Petroleum Institute Recommended Practice #56, herein incorporated by reference in its entirety.

In this test, uncoated or cured coated particulate material, in a sieve range of 20/40 mesh are selected and weighed. In particular, using a sample splitter an 80 to 100 gram sample is obtained and sieved. From the sample remaining after sieving a 40 gram sample is obtained and placed into the test cell (1.5 to 3 inch internal diameter, Rockwell C hardness of 43 or better (Rockwell C 60 Preferred). Using a hydraulic load frame (press), 50,000 lbf, Forney, Inc., Model No. FT-0040D or equivalent), the sample is then pressed by a piston in a crush cell at 10,000 psi for three minutes (pressure applied in one minute and maintained for two additional minutes). The press is removed and the sample is poured onto the same 20/40 screen. The crushed fines fraction that falls through the screen is weighed and compared to the first weight. The percent crush is equal to the weight of the crushed fines fraction to the weight of the sample prior to the pressing.

6. Cyclic Stress Test

The Cyclic Stress Test measures how a consolidated proppant pack responds to stress and movement caused in a subterranean formation during normal operation. It employs a sample of consolidated proppant at a loading of typically 3–4 pounds of proppant per square foot of fracture. It is performed for series of 30 cycles wherein during each cycle a plunger subjects a consolidated proppant pack in a cell to a first compressive force of 1000 psi for a time of at a selected temperature in the range of about 150–350° F., typically 195° F., and then the plunger subjects the consolidated proppant sample in the cell to a second compressive force of 4000 psi for a time at the above-mentioned temperature such that one cycle, defined as the time the pack is at 1000 psi and then at 4000 psi and then returned to 1000 psi, is 90 minutes. After this period, the pressure is reduced, back to the initial 1000 psi and another cycle is initiated. The amount of proppant flowback can be monitored at each cycle by the mass of proppant recovered from the test cell. Because there is constant water flow through the cell during the cycles, any proppant dislodged from the proppant pack can be recovered from the test cell. After the 30th cycle, flow back is measured by accumulating the total mass of proppant flowback and comparing this to the mass initially charged to the test cell (as a percent of the original). The coated particles of the invention present a flowback of less than 15%, preferably less than 10% or less than 5% when run at a temperature of 195° F. The test cell is 8 $inch^2$ cell having a cell lining of Ohio sandstone, with a test loading of 4 pounds per square foot which equals 100 grams in the test cell. The hydraulic flow through the cell is 2% KCl solution at 17 square centimeters per minute during the cycles.

G. Use of Coated Particles as Proppant

The coated particles, as described in this invention can be applied as the sole proppant in a 100% proppant pack (in the hydraulic fracture) or as a part replacement of existing commercial available ceramic and/or sand-based proppants, resin-coated and/or uncoated, or as blends between those, e.g., coated particles are 10 to 50 weight % of the proppant injected into the well. For example, after the precured proppant or uncoated proppant is placed in a well, the curable proppant of the present invention can be placed in the well to be located at the fracture openings.

The method may comprise curing the curable resin composition by exposing the resin composition to sufficient heat and pressure in the subterranean formation to cause crosslinking of the resins and consolidation of the curable proppant of the present invention. In some cases an activator can be used to facilitate consolidation of curable proppant. In another embodiment employing a curable resin composition on the proppant, the method further comprises low temperature acid catalyzed curing at temperatures as low as 70° F. An example of low temperature acid catalyzed curing is disclosed by U.S. Pat. No. 4,785,884 incorporated herein by reference in its entirety.

The coated particles of the invention are especially advantageous whether the coated particles are used alone as a proppant, or together with other proppants as a tail end after using uncoated proppant or precured coated proppant or another curable proppant to be in the portion of the fracture nearest the wellbore.

H. Use of Coated Particles as Gravel Packing for Sand Control

It is known that oil or gas well boreholes are provided with gravel packing about their bore holes. Another aspect of the present invention is that these gravel packs may be provided with the coated particles of the present invention. These coated particles would be provided in the standard sizes known for gravel used in gravel packs. Gravel packing is typically applied by as multi-layer packs. Typically the strength requirements for a proppant particle are higher than for gravel packing. The gravel pack may serve for sand control to prevent flow of formations fines of sand from the formation into the well bore.

For example a gravel pack may be formed adjacent to bore holes for the purpose of forming a permeable solid barrier that restrains the movement of said sand by:
a. injecting the coated particles into the sand formation in a zone around a bore hole;
b. curing the injected particles within the zone;
c. to form a permeable solid barrier is formed which restrains the movement of the sand.

For example, resin-containing particulate material may be used by filling a cylindrical structure with the resin-containing particulate material, i.e., proppant, and inserted into the wellbore. Once in place, the improved properties of this invention are beneficial because the proppant will cure and act as a filter or screen to eliminate the backwards flow of sand, other proppants, or subterranean formation particles. This is a significant advantage to eliminate the back flow of particulates into above ground equipment.

VI. EXAMPLES

The following examples serve to illustrate the present invention, and all parts and percentages are by weight unless otherwise indicated, and all screen mesh sizes are U.S. Standard Screen sizes.

Examples 1–5

The following general coating procedures were followed to prepare curable proppants having multiple inner resole-furan layers and a single outer layer. 1000 grams of the substrate to be coated (either sand, ceramic, or other proppant substrate) is heated to 400–410° F. while mixing in a Hobart C-100 lab mixer and the heat source is removed. In the order shown below (and times specified), the resin(s) are added, in addition to the catalysts, curatives, or additives as indicated. At the end of this cycle, the material is discharged from the mixer as a free flowing product consisting of individual sand grains coated with a curable resin coating and cooled quickly for characterization. The stick melting point of this product was determined.

TABLE 1A shows the procedure and ingredients for coating bauxite wherein the bauxite is heated in the mixer to the desired temperature and then components are added in the ratio, and at times as noted. Amounts in TABLE 1A are in grams unless otherwise indicated. Results are shown in TABLES 1B and 1C.

In the Examples of TABLE 1A, and TABLES 2A and 3A the silane is A1100 adhesion promoter from Union Carbide Corporation. The proppant was coated with PFFA Resole Ex18663 known as Plasti Flake EX18663, a commercial phenol-formaldehyde resole furfuryl alcohol terpolymer resin manufactured by Borden, Inc./North American Resins, Louisville, Ky.

Also, the proppant was coated with PF Novolac 5150 known as Plasti Flake EX5150, a commercial phenol-formaldehyde novolac manufactured by Borden, Inc./North American Resins, Louisville, Ky.

Chembetaine is a shortened reference to a lubricant. It is a fatty acid amide derivative (coamidopropyl hydroxysultaine) purchased from Chemron Corp.

TABLE 1A

| COMPONENT Weight (gms) | Time (s) | Comparative Example A[1,2] | Example 1[1,2] | Example 2[1,2] | Example 3[1,2] | Example 4[1,2] | Example 5[1,2] |
|---|---|---|---|---|---|---|---|
| 20/40 bauxite | 0 | 1000 | 1000 | 1000 | 1000 | 1000 | 1000 |
| Initial Temperature (° F.) | 0 | 460 | 410 | 460 | 410 | 460 | 410 |
| PFFA resole (Ex18663) | 0 | 22 | 22 | 22 | 22 | 22 | 22 |
| A 1100 silane | 7 | 0.4 | 0.8 | 0.8 | 0.4 | 0.4 | 0.4 |
| Ammonium chloride % Conc./gms of ammonium chloride used | 40 | 10%/ 1.16 | 10%/ 1.16 | 10%/ 1.16 | 2.5%/ 1.16 | 2.5%/ 1.16 | 2.5%/ 1.16 |
| PFFA resole (Ex 18663) | 80 | 22 | 22 | 22 | 22 | 22 | 22 |
| Ammonium chloride % Conc./gms of ammonium chloride used | 120 | 10%/ 2.32 | 10%/ 2.32 | 10%/ 2.32 | 2.5%/ 1.16 | 2.5%/ 1.16 | 2.5%/ 1.16 |
| PF Novolac (EX5150) | 160 | 15 | 16[2] | 16[2] | 15 | 15 | 15 |
| Hexamethylene-Tetramine (hexa) % Conc./gms. | 200 | 40%/ 5.6 | 40%/ 5.6 | 4%/ 5.6 | 12%/ 5.6 | 4%/ 5.6 | 4%/ 5.6 |
| Chembetaine | 240 | 0.3 | 0.3 | 0.3 | 0.3 | 0.3 | 0.3 |
| Discharge and cool | 280 | | | | | | |

[1]@ 3.6–4.2% LOI
[2]contained 7% kynol novoloid fibers, available from American Kynol, Inc., Pleasantville, NY

TABLE 1B

| PROPERTIES (cooled) | Comparative Example A | Example 1 | Example 2 | Example 3 | Example 4 | Example 5 |
|---|---|---|---|---|---|---|
| Stickpoint (° F.) | >360 | 323 | 243 | 251 | 266 | 246 |
| % crush @ 10,000 PSI | 0.1 | 0.1 | 0.1 | 0.4 | 0.13 | 0.2 |
| % acetone extractables[3] | 0 | 14 | 24 | 41 | 19 | 43 |

[3]acetone extractables are an insight into the amount of "curability" or degree of crosslink that remains in the coated substrate and is a significant insight into the curable/curable layers that are formed.

TABLE 1C

| PERFORMANCE | Comparative Example A | Example 1 | Example 2 | Example 3 | Example 4 | Example 5 |
|---|---|---|---|---|---|---|
| UCS 250° F./24 hours[4] | 225 | 882 | 342 | 1100 | 815 | 950 |
| UCS @ 1 hour slurry, 200° F. | ? | 802 | 336 | 1005 | 874 | 987 |
| UCS @ 2 hour slurry, 200° F. | ? | 958 | 222 | 858 | 884 | 830 |
| UCS @ 3 hour slurry, 200 F. | ? | 530 | ? | 1000 | 838 | 925 |
| % UCS after rebonding test[5] | ? | ? | ? | 2% | 11% | |
| Flowback @ 30 cycles[6] | 9% | <1% | >15% | 1% | 2% | <1% |

[4]UCS test defined above under the heading Coated Particle Parameters
[5]Rebonding Test defined above under the heading Coated Particle Parameters
[6]Cyclic Stress Test defined above under the heading Coated Particle Parameters Processing the substrate and coating components at this temperature (and in the proportions indicated for the times specified) will yield a coated bauxite with layered coatings, each layer of which is not highly crosslinked. The effect is to yield resilient coatings that enable the resin coated substrate to exhibit resistance to failure under cyclic stress and retain a high level of bonding capability, even after subjected to aqueous slurries at high temperature for extended periods of time.

These test results confirm a performance capability of the coated particles of the invention to withstand at least 30 pressure cycles without the bonded matrix breaking down. These results also show less than 1% flowback of the resin coated material following these pressure cycles (bottom row of TABLE 1C).

Table 1C, shows materials after discharge can be slurried in 200° F. aqueous KCl and evaluated for bond strength using a standard Unconfined Compressive Strength test. Compressed slugs prepared at 250° F. and 1000 psi compression, and then tested for compressive strength as a function of time in the slurry, retained nearly all of their bonding strength potential (within the error of the test). After each sample had been tested for UCS performance, the slugs were broken down and screened into individual particles and then resubmitted for UCS tests again. It will be found that these materials retain a capability to reform the slug, reflecting an ability to re-bond in the formation, if a consolidated material should fracture during use.

Sand Examples

The following Examples demonstrate the invention and properties documented for the resin coated sand. In these examples sand is heated in the mixer to the desired temperature and then components are added in the ratio, and at times as noted in TABLE 2A and 3A. TABLES 2B and 2C as well as 3A, 3B and 3C show data resulting from these examples. Amounts in TABLES 2A and 3A are in grams unless otherwise indicated.

Tables 2A and 3A show examples where the substrate was 20/40 white sand. The examples show that conditions of reduced temperature, catalyst and curing agent cause a level of curability within the layers. This is evidenced by the softening point (topcoat dominant) and acetone extractables (wherein all layers probably contribute). Examples 17 and 19 show the percent acetone extractables is actually greater than the weight of the topcoat (outer coating) alone (about 30%). This shows the inner coatings to be curable.

TABLE 2A

| Component[7,8] Weight (g) | Time (s) | Comparative Example B | Example 6 | Example 7 | Example 8 | Example 9 | Example 10 | Example 11 |
|---|---|---|---|---|---|---|---|---|
| 20/40 sand | 0 | 1000 | 1000 | 1000 | 1000 | 1000 | 1000 | 1000 |
| Initial temperature (° F.) | | 460 | 460 | 460 | 460 | 460 | 410 | 460 |

TABLE 2A-continued

| Component[7,8] Weight (g) | Time (s) | Comparative Example B | Example 6 | Example 7 | Example 8 | Example 9 | Example 10 | Example 11 |
|---|---|---|---|---|---|---|---|---|
| PFFA resole (Ex18663) | 0 | 22 | 22 | 22 | 22 | 22 | 22 | 22 |
| A 1100 silane | 7 | 0.4 | 0.4 | 0.4 | 0.4 | 0.4 | 0.8 | 0.4 |
| Ammonium chloride Conc./gms. | 40 | 10%/ 1.16 | 10%/ 1.16 | 10%/ 1.16 | 1%/ 1.16 | 1%/ 1.16 | 10%/ 1.16 | 10%/ 1.16 |
| PFFA resole (Ex18663) | 80 | 22 | 22 | 22 | 22 | 22 | 22 | 22 |
| Ammonium chloride Conc./gms. | 120 | 10%/ 2.32 | 10%/ 2.32 | 10%/ 2.32 | 1%/ 2.33 | 1%/ 2.33 | 2.5%/ 1.16 | 10%/ 2.33 |
| PF Novolac (EX5150) | 160 | 15 | 15 | 15 | 15 | 15 | 16* | 15 |
| Hexa conc./gms | 200 | 40%/ 5.6 | 4%/ 5.6 | 10%/ 22.4 | 40%/ 5.6 | 40%/ 5.6 | 4%/ 5.6 | 4%/ 5.6 |
| Chembetaine | 240 | 0.3 | 0.3 | 0.3 | 0.3 | 0.3 | 0.3 | 0.3 |
| Discharge and cool | 280 | | | | | | | |

[7] coated @ 3.6–4.2% LOI
[8] contained 7% kynol fibers available from American Kynol, Inc., Pleasantville, NY

TABLE 2B

| Properties (cooled) | Comparative Example A | Example 6 | Example 7 | Example 8 | Example 9 | Example 10 | Example 11 |
|---|---|---|---|---|---|---|---|
| Stickpoint (° F.) | >335 | 243 | 265 | >335 | >335 | 296 | 239 |
| % crush @ 10,000 psi | 3.1 | 3.3 | 3.7 | 2.9 | 4.4 | 5.1 | 3.2 |
| % acetone extractables[7] | 1 | 18.8 | 18.4 | 2.9 | 8.6 | 18 | 24.3 |

[9] acetone extractables are an insight into the amount of "curability" or degree of crosslink that remains in the coated substrate and is a significant insight into the curable/curable layers that are formed

TABLE 2C

| Performance | Comparative Example A | Ex. 6 | Ex. 7 | Ex. 8 | Ex. 9 | Ex. 10 | Ex. 11 |
|---|---|---|---|---|---|---|---|
| UCS 250° F./ 24 hours | 250 | 365 | 353 | 146 | 283 | 943 | 330 |

TABLE 3A

| Component[10] | Time (sec.) | Ex. 12 | Ex. 13 | Ex. 14 | Ex. 15 | Ex. 16 | Ex. 17 | Ex. 18 | Ex. 19 |
|---|---|---|---|---|---|---|---|---|---|
| 20/40 sand | 0 | 1000 | 1000 | 1000 | 1000 | 1000 | 1000 | 1000 | 1000 |
| Initial temp. (° F.) | | 460 | 460 | 460 | 460 | 460 | 410 | 460 | 400 |
| PFFA resole (Ex18663) | 0 | 22 | 22 | 22 | 22 | 22 | 22 | 22 | 22 |
| A 1100 silane | 7 | 0.4 | 0.4 | 0.4 | 0.4 | 0.4 | 0.4 | 0.4 | 0.4 |
| Ammonium chloride Conc./gms. | 40 | 1%/ 1.16 | 3%/ 1.16 | 3%/ 1.16 | 3%/ 1.16 | 2.5%/ 1.16 | 2.5%/ 1.16 | 2.5%/ 1.16 | 2.5%/ 1.16 |
| PFFA resole (Ex18663) | 80 | 22 | 22 | 22 | 22 | 22 | 22 | 22 | 22 |
| Ammonium chloride Conc./gms. | 120 | 1%/ 2.33 | 3%/ 2.33 | 3%/ 2.33 | 3%/ 2.33 | 2.5%/ 1.16 | 2.5%/ 1.16 | 2.5%/ 1.16 | 2.5%/ 1.16 |

TABLE 3A-continued

| Component[10] | Time (sec.) | Ex. 12 | Ex. 13 | Ex. 14 | Ex. 15 | Ex. 16 | Ex. 17 | Ex. 18 | Ex. 19 |
|---|---|---|---|---|---|---|---|---|---|
| PF Novolac (EX5150) | 160 | 15 | 15 | 15 | 15 | 15 | 15 | 15 | 15 |
| Hexa Conc./gms. | 200 | 4%/ 5.6 | 40%/ 5.6 | 12%/ 5.6 | 12%/ 5.6 | 12%/ 5.6 | 12%/ 5.6 | 4%/ 5.6 | 4%/ 5.6 |
| Chembetaine | 240 | 0.3 | 0.3 | 0.3 | 0.3 | 0.3 | 0.3 | 0.3 | 0.3 |
| Discharge and cool (° F.) | 280 | 280 | 280 | 280 | 280 | 280 | 280 | 280 | 280 |

[10]coated 3.06–4.02% LOI

TABLE 3B

| PROPERTIES cooled | Ex. 12 | Ex. 13 | Ex. 14 | Ex. 15 | Ex. 16 | Ex. 17 | Ex. 18 | Ex. 19 |
|---|---|---|---|---|---|---|---|---|
| Stickpoint (° F.) | 257 | >335 | 305 | 283 | 304 | 250 | 254 | 247 |
| % crush @ 10,000 psi | 5.6 | 3.5 | 4.7 | 4.1 | 5.6 | 9.3 | 5 | 7 |
| % acetone extractables[11] | 10.8 | 4.7 | 5.6 | 7.7 | 28 | 44 | 25 | 38 |

[11]acetone extractables are an insight into the amount of "curability" or degree of crosslinking that remains in the coated substrate and is a significant insight into the curable/curable layers formed.

TABLE 3C

| PERFORMANCE | Ex. 12 | Ex. 13 | Ex. 14 | Ex. 15 | Ex. 16 | Ex. 17 | Ex. 18 | Ex. 19 |
|---|---|---|---|---|---|---|---|---|
| UCS 250° F./ 24 hrs. | 445 | 263 | 438 | 350 | 267 | 567 | 327 | 1003 |

As discussed above, the coated particulate material of the invention maintains a high compressive strength, as measured by the UCS method above, despite being subjected to the slurry cycle.

As discussed above, the proppants of the invention comprise multiple curable coatings of a resin atop a substrate. Although the resins are applied in an uncured state and partially cured by the addition of a respective curative, each individual, preferably, remains curable in the final product. That is to say, despite additional coatings (and partial curing of the additional coatings) each resin remains in a curable state. As evidence thereof, the coated particle of Example 19 was formed in accordance with the procedure of Table 3A, however, the procedure was modified, if at all, as follows:

Test #1: The procedure was halted 40 seconds after the addition of the first ammonium chloride. Thereafter, water was substituted for each remaining component. The particle, having a single layer, was discharged after 280 seconds.

Test #2: The procedure was halted after the second ammonium chloride was added. Again, water was thereafter substituted for the remaining components. The particle, having two layers, was discharged after 280 seconds.

Test #3: The entire process of Table 3A was conducted. The particle, having three layers, was discharged after 280 seconds.

Test #4: The two additions of FFFA resole (Ex18663) were combined into a single addition at time "0", followed by a single addition of the two quantities of ammonium chloride at 40 seconds. At 160 seconds, the remainder of the procedure was followed.

The following Table 3D presents the acetone extractable percentages for the particles of these tests.

TABLE 3D

| Test No. | Acetone Extractable % |
|---|---|
| 1 | 41 |
| 2 | 52 |
| 3 | 48 |
| 4 | 47 |

From Table 3D, it can be seen that each of the curable layers remains curable when subjected to further additions of resins and partial curing thereof.

Table 4 shows changes in compressive strength in both samples of the invention and comparative examples.

TABLE 4

| SAMPLE | Reaction Conditions | Initial UCS (psi) | UCS @ 1 hour Slurry (psi) | % UCS Retained | UCS @ 2 hours Slurry (psi) | % UCS Retained | UCS @ 3 hours Slurry (psi) | % UCS Retained |
|---|---|---|---|---|---|---|---|---|
| Comp. B | Fully curable 1 layer | 2820 | 2000 | 71 | 1466 | 56 | — | — |
| Comp. C | Curable 1 layer | 705 | 535 | 76 | 466 | 66 | 330 | 47 |
| Comp. D | Cured/ Curable | 530 | | | | | 161 | 30 |
| Ex. 1b | 100% acid/ 10% hexa, @ 410° F. | 883 | 802 | 91 | 958 | 99 | 530 | 60 |

TABLE 4-continued

| SAMPLE | Reaction Conditions | Initial UCS (psi) | UCS @ 1 hour Slurry (psi) | % UCS Retained | UCS @ 2 hours Slurry (psi) | % UCS Retained | UCS @ 3 hours Slurry (psi) | % UCS Retained |
|---|---|---|---|---|---|---|---|---|
| Ex. 2a | 100% acid/ 10% hexa, @ 460° F. | 345 | 350 | 102 | 365 | 107 | | |
| Ex. 2b | 100% acid/ 10% hexa, @ 460° F. | 343 | 336 | 98 | 222 | 65 | | |
| Ex. 3a | 25% acid/ 30% hexa, @ 400° F. | 1170 | 1005 | 86 | 858 | 73 | | |
| Ex. 3b | 25% acid/ 30% hexa, @ 400° F. | 1100 | 1000 | 91 | 858 | 78 | 1000 | 91 |
| Ex. 3c | 25% acid/ 30% hexa, @ 400° F. | 730 | | | | | 572 | 78 |
| Ex. 3d | 25% acid/ 30% hexa, @ 400° F. | 635 | | | | | 638 | 100 |
| Ex. 3e | 25% acid/ 30% hexa, @ 400° F. | 900 | | | | | 915 | 102 |
| Ex. 4a | 25% acid/ 10% hexa, @ 460° F. | 800 | 874 | 107 | 653 | 80 | | |
| Ex. 5a | 25% acid/ 10% hexa, @ 400° F. | 1450 | 987 | 68 | 830 | 57 | | |
| Ex. 5d | 25% acid/ 10% hexa, @ 400° F. | 558 | | | | | 600 | 108 |
| Ex. 5b | 25% acid/ 10% hexa, @ 400° F. | 877 | | | | | 817 | 93 |

As used in Table 4, the examples ending in "a" indicate a first use of sand as the particulate, "b" indicates a first use of bauxite, "c" indicates a second run with sand, "d" indicates a light weight ceramic particulate, and "e" indicates a second run using bauxite. The proppant had two inner layers of a curable resole and a single outer layer of curable novolac.

In Table 4, the acid catalyst is ammonium choride, the % acid represents the fraction of this catalyst that is typically used to attain a "precured condition" at this temperature to completely cure the resin", the % hexa represents the fraction of this curative that is typically used to ultimately attain a "totally cured condition" either during the coating process or later within the fractured formation, and the temperature represents initial substrate temperature For example, 25% hexa means the amount of hexa employed is 25% of the amount normally employed to make a precured catalyst.

Comparative Example B is a single curable layer of novolac resin, exhibiting an acetone extractable percent close to 100% over sand particles.

Comparative Example C is a single curable layer of novolac resin similar to Comparative Example B, but is partially cured as made, to be curable, i.e., having an acetone extractable percent of about 30%, but have sufficient hexa to substantially cure downhole. In contrast to the preferred formulations used to form the coated particles of the invention, during the manufacture of Comparative Example C, enough curative is provided to completely cure the single resin layer.

Comparative Example D has a cured first inner layer of novolac resin, substantially cured with hexa, followed by a second or outer layer of novolac, which is curable as made and containing sufficient hexa to substantially cure downhole. The coatings are over sand particles. To measure UCS, two 6 inch slugs were produced, and each slug was cut in half to produce four samples to be tested. The data reported in Table 4 reflects the arithmetic mean of the four tested samples.

From Table 4, it can be seen that the coated particulate material of the invention exhibit a % retained UCS, following a 3 hour slurry of at least about 60%, typically greater than about 80%, preferably greater than about 90%, and most preferably about close to 100%. Furthermore, it can be seen that the coated particulate material of the invention shows a UCS absolute strength following the three hour slurry of at least about 500 psi, typically greater than about 600, preferably greater than about 850, and most preferably greater than about 1000 psi.

Example 20

Ability to Withstand Storage at 140° F.

TABLE 5 presents data for melt (stick) point and Unconfined Compressive Strength retention from a comparison of curable "Proppant AA" of the present invention (having multiple inner resole-furan layers and a single outer layer prepared as described above for Example 1) against a competitive proppant consisting of multiple layers of phenolic resin having a curable inner layer and a cured outer layer in a 140° F. environment (sitting in an oven). To carryout the stickpoint tests and the UCS measurements, for the test period, we put about 10000 gms of each sample into the oven to allow for periodic sampling. The total proppant is allowed to sit in respective metal gallon containers holding about 5000 grams each.

Proppant AA has a substrate of nearly pure bauxite having a specific gravity of about 3.4 to 3.6 and three curable coatings. The first (innermost) coating layer comprises FA resole that is a terpolymer of phenol, formaldehyde and furfural alcohol with an ammonium chloride catalyst. The second (middle) layer also comprises FA resole that is a terpolymer of phenol, formaldehyde and furfural alcohol with an ammonium chloride catalyst. The third (outer) layer comprises novolac and HEXA and is at least partially curable. Proppant AA was prepared according to the procedure of Example 1.

TABLE 5

| Days of Storage | Sample Proppant | Melt (stick) Point (° F.) | UCS @ 250° F. |
|---|---|---|---|
| 0 | 20/40 Proppant AA | 277 | 873 |
|   | 20/40 Competitive Proppant | 275 | 498 |
| 8 | 20/40 Proppant AA | 277 | 845 |
|   | 20/40 Competitive Proppant | 302 | 325 |
| 14 | 20/40 Proppant AA | 285 | 835 |
|   | 20/40 Competitive Proppant | 309 | 318 |
| 28 | 20/40 Proppant AA | 279 | 1013 |
|   | 20/40 Competitive Proppant | 315 | 160 |

The TABLE 5 data for UCS shows the proppant of the present invention has much higher UCS retention than the competitive proppant after long term storage at 140° F. The significance of the stickpoint not changing for Proppant AA is reflected in the UCS numbers. Namely, the present invention retains the curability/bondability of this material versus the competitive proppant.

It should be apparent that embodiments other than expressly described above come within the spirit and scope of the present invention. Thus, the present invention is not limited by the foregoing description but rather by the claims appended hereto.

What is claimed is:

1. A coated particle comprising:
a particulate substrate;
at least one layer of a first curable resin substantially surrounding the substrate; and
at least one layer of a second curable resin substantially surrounding the at least one layer of the first curable resin, wherein in the layer of the first curable resin and in the layer of the second curable resin, the amount of curative employed in each layer is less than the amount required to substantially cure the resin.

2. The coated particle of claim 1, wherein the coated particle has an acetone extraction percentage of greater than about 15.

3. The coated particle of claim 2, wherein the coated particle has less than 15% flowback after a 30 cycle cyclic stress test, when run at 195° F. with an upper pressure of 4000 and a lower pressure of 1000 psi.

4. The coated particle of claim 1, wherein the coated particle has a bond-strength retention of greater than about 60%, as measured by the ratio of (i) the compressive strength measured in a UCS test, following mixing the coated particles with a 2% aqueous solution of KCl at a ratio of 12 pounds of particles per gallon of KCl solution to form a mixture, followed by heating the mixture to 200° F. for 3 hours to (ii) the compressive strength measured in a UCS test following mixing the coated particles with a 2% aqueous solution of KCl at a ratio of 12 pounds of particles per gallon of KCl solution to form a mixture.

5. The coated particle of claim 4, wherein the bond-strength retention is greater than about 70%.

6. The coated particle of claim 4, wherein the bond-strength retention is greater than about 80%.

7. The coated particle of claim 4, wherein the bond-strength retention is greater than about 90%.

8. The coated particle of claim 4, wherein the bond-strength retention is about 100%.

9. The coated particle of claim 1, wherein the coated particle has a compressive strength retention of at least 80% as measured by a UCS test, following 28 days of storage at 140 degrees F.

10. The coated particle of claim 9, wherein the coated particle has a compressive strength retention of at least 90% as measured by a UCS test, following 28 days of storage at 140 degrees F.

11. The coated particle of claim 9, wherein the coated particle has a compressive strength retention of at least 95% as measured by a UCS test, following 28 days of storage at 140 degrees F.

12. The coated particle of claim 1, wherein the coated particle has less than 15% flowback after a 30 cycle cyclic stress test, when run at 195° F. with an upper pressure of 4000 psi and a lower pressure of 1000 psi.

13. The coated particle of claim 1, wherein the coated particle has a rebonding strength of at least a 50 psi compressive strength.

14. The coated particle of claim 1, wherein the coated particle has a rebonding strength of at least 5% of its original UCS compressive strength and at least a 50 psi compressive strength.

15. The coated particle of claim 1, wherein the coated particle has a rebonding strength of at least 10% of its original UCS compressive strength.

16. The coated particle of claim 1, wherein the first curable resin is selected from the group consisting of phenol-aldehyde, epoxy, urea-aldehyde, furfuryl alcohol, melamine-aldehyde, polyester, alkyd, novolac, furan reins, a combination of a phenolic resin and a furan resin; and a terpolymer of a phenol, furfuryl alcohol and an aldehyde, and
the second curable resin is selected from the group consisting of phenol-aldehyde, epoxy, urea-aldehyde, furfuryl alcohol, melamine-aldehyde, polyester, alkyd, novolac, furan reins, a combination of a phenolic resin and a furan resin; and a terpolymer of a phenol, furfuryl alcohol and an aldehyde, wherein the first curable resin composition and the second curable resin composition may be the same or different.

17. The coated particle of claim 1, wherein the first curable resin comprises a member of the group consisting of a furan resin; a combination of a phenolic resin and a furan resin; and a terpolymer of a phenol, furfuryl alcohol and an aldehyde; and the second curable resin comprising a curable novolac-containing resin.

18. The coated particle of claim 17, wherein the phenolic resin moiety comprises thermo setting resins containing phenol or substituted phenols where either the two ortho, one ortho and the para, or the two ortho and the para positions are unsubstituted, and formaldehyde or other aldehydes.

19. The coated particle of claim 17, wherein the phenolic resin moiety comprises phenol-formaldehyde.

20. The coated particle of claim 17, wherein the first curable resin comprises the terpolymer of phenol, furfuryl alcohol, and aldehyde, and the aldehyde comprises formaldehyde.

21. The coated particle of claim 17, wherein the phenolic resin moiety is a resole.

22. The coated particle of claim 17, wherein the furan resin moiety is selected from the group consisting of the reaction product of furfuryl alcohol with formaldehyde, the self-polymerization of furfuryl alcohol, the reaction product of furfuryl with formaldehyde, the self-polymerization of furfuryl, and combinations thereof.

23. The coated particle of claim 1, having a melting point in the range from about 200° F. to about 300° F., as measured by a stick point test.

24. The coated particle of claim 23, wherein the coated particle has an acetone extraction percentage of greater than about 15%.

25. The coated particle of claim 23, wherein the first resin is selected from the group consisting of:
(a) a furan resin;
(b) a combination of a phenolic resin and a furan resin;
(c) a terpolymer of a phenol, furfuryl alcohol and an aldehyde; and
the second resin comprises a novolac in combination with a curative for the novolac.

26. The coated particle of claim 23, wherein the coated particle has a bond-strength retention of greater than about 60% as measured by the ratio of (i) the compressive strength measured in a UCS test, following mixing the coated particle with a 2% solution of KCl at a ratio of 12 pounds of particles per gallon of KCl solution to form a mixture, followed by heating the mixture to 200° F. for 3 hours to (ii) the compressive strength measured in a UCS test following mixing the coated particles with a 2% aqueous solution of KCl at a ratio of 12 pounds of particles per gallon of KCl solution to form a mixture.

27. The coated particle of claim 23, wherein the coated particle has an unconfined compressive strength of greater than about 500 psi, as measured by the UCS test, following mixing the coated particle with the 2% solution of KCl at the ratio of 12 pounds of particles per gallon of KCl solution to form the mixture, followed by heating the mixture to 200° F. for 3 hours.

28. The coated particle of claim 1, wherein in each layer the amount of curative employed is less than 50% of the amount to substantially cure the resin.

29. The coated particle of claim 1, wherein in each layer the amount of curative employed is less than 25% of the amount to substantially cure the resin.

30. A process for producing the coated particle of claim 1, comprising the steps of mixing the first curable resin with the particulate substrate preheated to temperatures of about 225° to 550° F., to form a first curable resin coating on the substrate, and then coating the first curable coating with at least one outer coating comprising the second curable resin.

31. The process of claim 30, wherein the first curable resin is selected from the group consisting of furan, the combination of a phenolic resin and a furan resin, and a terpolymer of phenol, furfuryl alcohol and formaldehyde, and wherein the second curable resin comprises curable phenol formaldehyde novolac resin.

32. The process of claim 31, wherein the particulate substrate first resin mixture is contacted with a catalyst selected from the group consisting of:

(a) acids with a pKa of about 4.0 or lower;
(b) water soluble multivalent metal ion salts; and
(c) ammonia or amine salts of acids with a pKa of about 4.0 or lower.

33. The process of claim 32, wherein the acids from step (a) are selected from the group consisting of phosphoric, sulfuric, nitric, benzenesulfonic, toluenesulfonic, xylenesulfonic, sulfamic, oxalic, and salicylic acid.

34. The process of claim 32, wherein the salts of step (b) are selected from the group consisting of sulfates and chlorides.

35. The process of claim 34, wherein the metal moiety of step (b) is selected from the group consisting of Zn, Pb, Mn, Mg, Cd, Ca, Cu, Sn, Al, Fe and Co.

36. The process of claim 35, wherein catalyst the salts of step (c) is selected from the group consisting of nitrates, chlorides, sulfates and fluorides.

37. The process of claim 32, wherein the catalyst is selected from the group consisting of an ammonia salt of an acid having a pKa of about 4 or lower.

38. The particle made by the process of claim 37, wherein the catalyst is selected from the group consisting of ammonium chloride.

39. The process of claim 30, wherein the particulate substrate is selected from the group consisting of sand, bauxite, zircon, ceramic particles, glass beads and mixtures thereof.

40. The process of claim 30, wherein the particulate substrate is sand that varies from about 8–100 mesh in size.

41. The process of claim 30, further comprising:
adding a first curative to the first curable resin coating in an amount sufficient to at most partially cure the first curable resin, and
adding a second curative to the second curable resin coating in an amount sufficient to at most partially cure the second curable resin coating.

42. A method for treating a subterranean formation comprising the steps of:
applying to the subterranean formation a mixture of the coated particles of claim 1 and a hydraulic fracturing fluid and curing the particles within fractures in the subterranean formation.

43. A method for forming a gravel pack about a well bore comprising introducing the coated particles of claim 1 into the well bore.

44. The coated particle of claim 1, wherein the coated particle has a rebonding strength of at least 5% of its original UCS compressive strength.

45. The coated particle of claim 44, wherein the coated particle has an acetone extraction percentage of greater than about 15%.

46. A process for producing coated particulate material of claim 44, comprising the steps of mixing the first resin with the particulate substrate preheated to temperatures of about 225°–550° F., to form a first resin coating on the substrate, and then coating the first resin coating with at least one outer coating comprising the second resin.

47. A method for treating a subterranean formation comprising the steps of:
applying to the subterranean formation a mixture of the coated particles of claim 44 and a hydraulic fracturing fluid and curing the particles within fractures in the subterranean formation.

48. A method for forming a gravel pack about a well bore comprising introducing the coated particles of claim 44 into the well bore.

49. The coated particle of claim 1,
wherein each of said at least one layer of first curable resin and each of said at least one layer of second curable resin have an acetone extractable percentage of greater than about 35.

50. The coated particle of claim 49, wherein each of said at least one layer of first curable resin and each of said at least one layer of second curable resin have an acetone extractable percentage of greater than about 40.

51. The coated particle of claim 49, wherein the first curable resin and the second curable resin are the same.

52. The coated particle of claim 49, wherein the first curable resin and the second curable resin are different.

53. The coated particle of claim 1, wherein the coated particle has a compressive strength retention of at least 80% as measured by a UCS test, following 14 days of storage at 140 degrees F.

54. The coated particle of claim 1, wherein the coated particle has a compressive strength retention of at least 90% as measured by a UCS test, following 14 days of storage at 140 degrees F.

55. The coated particle of claim 1, wherein the coated particle has a compressive strength retention of at least 95% as measured by a UCS test, following 14 days of storage at 140 degrees F.

56. The coated particle of claim 1,
wherein the coated particle has an acetone extraction percentage for the layer of the first curable resin or the layer of the second curable resin of about 15 to about 50%, based on the weight of each layer.

57. The coated particle of claim 56, wherein the coated particle has an acetone extraction percentage for each layer of about 15 to about 45%, based on the weight of each layer.

58. The coated particle of claim 56, wherein the coated particle has an acetone extraction percentage for each layer of about 15 to about 30%, based on the weight of each layer.

59. The coated particle of claim 56, wherein the first curable resin and the second curable resin are the same.

60. The coated particle of claim 56, wherein the first curable resin and the second curable resin are different.

61. The coated particle of claim 1, comprising
at least one layer of a third substantially surrounding the at least one layer of the second curable resin, wherein the amount of curative employed in the at least one layer of the third curable resin is less than the amount required to substantially cure the resin.

62. The coated particle of claim 1, wherein the first curable resin and the second curable resin are the same.

63. The coated particle of claim 1, wherein the first curable resin and the second curable resin are different.

64. A coated particle comprising:
a particulate substrate, and a curable resinous coating disposed thereon, wherein the coated particle has a bond-strength retention of greater than about 70% as measured by the ratio of (i) the compressive strength measured in a UCS test, following mixing the coated particle with a 2% solution of KCl at a ratio of 12 pounds of particles per gallon of KCl solution to form a mixture, followed by heating the mixture to 200° F. for 3 hours to the (ii) compressive strength measured in a UCS test following mixing the coated particles with a 2% aqueous solution of KCl at a ratio of 12 pounds of particles per gallon of KCl solution to form a mixture.

65. The coated particle of claim 64, wherein the bond-strength retention is greater than about 90%.

66. The coated particle of claim 64, wherein the coated particle has a compressive strength of greater than about 500 psi, as measured by the UCS test, following mixing the coated particle with a 2% solution of KCl at a ratio of 12 pounds of particles per gallon of KCl solution to form a mixture, followed by heating the mixture to 200° F. for 3 hours.

67. The coated particle of claim 64, wherein the coated particle has a compressive strength greater than about 1000 psi, as measured by the UCS test, following mixing the coated particle with a 2% solution of KCl at a ratio of 12 pounds of particles per gallon of KCl solution to form a mixture, followed by heating the mixture to 200° F. for 3 hours.

68. The coated particle of claim 64, wherein coated particle has an acetone extraction percentage of about 15 to 45.

69. The coated particle of claim 68, wherein the coated particle has less than 15% flowback after a 30 cycle cyclic stress test at a maximum pressure of 4000 psi and a minimum pressure of 1000 psi when run at 195° F.

70. The coated particle of claim 68, wherein the coated particle has a rebonding strength of at least 50 psi compressive strength.

71. The coated particle of claim 68, wherein the coated particle has a rebonding strength of at least 5% of its original UCS compressive strength.

72. The coated particle of claim 68, wherein the coated particle has a rebonding strength of at least 10% of its original UCS compressive strength.

73. The coated particle of claim 64, wherein the coated particle has a first curable resin coating and optionally a second curable resin coating, and wherein the first curable resin is selected from the group consisting of phenol-aldehyde, epoxy, urea-aldehyde, furfuryl alcohol, melamine-aldehyde, polyester, alkyd, novolac, furan reins, a combination of a phenolic resin and a furan resin; and a terpolymer of a phenol, furfuryl alcohol and an aldehyde, and
the second curable resin is selected from the group consisting of phenol-aldehyde, epoxy, urea-aldehyde, furfuryl alcohol, melamine-aldehyde, polyester, alkyd, novolac, furan reins, a combination of a phenolic resin and a furan resin; and a terpolymer of a phenol, furfuryl alcohol and an aldehyde, wherein the first curable resin composition and the second curable resin composition may be the same or different.

74. The coated particle of claim 64, wherein the amount of curative employed is less than 50% of the amount to substantially cure the curable resin.

75. The coated particle of claim 64, wherein the resin coating comprises a curative in an amount sufficient to at most partially cure the curable resinous coating.

76. A process for producing the coated particle of claim 64, comprising the steps of mixing a first curable resin with the particulate substrate preheated to temperatures of about 225° to 550° F., to form a first curable resin coating on the substrate, and then coating the first curable coating with at least one outer coating comprising the second curable resin.

77. The process of claim 76, further comprising:
adding a first curative to the first curable resin coating in an amount sufficient to at most partially cure the first curable resin and
adding a second curative to the second curable resin coating in an amount sufficient to at most partially cure the second curable resin coating.

78. The process of claim 77, comprising:
(a) combining an incremental amount of uncured resin selected from the group consisting of a furan, a combination of a phenolic resin and a furan resin, or a terpolymer of phenol, furfuryl alcohol and formaldehyde, with the particulate substrate preheated to a temperatures of about 350° to 450° F., to form a mixture, and mixing the mixture at a temperature of about 225° to 450° F. for a time sufficient to coat the particulate substrate with the resin to form a resin coated particulate substrate;

(b) contacting the resin coated particulate substrate with a catalyst selected from the group consisting of:
  (i) acids with a pKa of about 4.0 or lower;
  (ii) water soluble multivalent metal ion salts; and
  (iii) ammonia or amine salts of acids with a pKa of about 4.0 or lower; and
(c) repeating steps (a) and (b) at least once to form a coated intermediate particle product; and
(d) mixing an amount of uncured novolac resin with the coated intermediate particle product and hexamethylenetetramine.

79. The process of claim 78, wherein the catalyst is an aqueous solution of ammonium chloride.

80. The process of claim 78, wherein the incremental amount of resin is about 5 to 50% by weight of the total amount of resin.

81. The process of claim 78, wherein about 0.01 to about 0.5 weight percent of a lubricant is added to the mixture of particulate matter and resin.

82. The process of claim 78, wherein the lubricant is added after the last amount of catalyst is added and before the mixture breaks down.

83. The process of claim 78, further comprising adding a first curative to the first curable resin coating in an amount sufficient to at most partially cure the first curable resin and adding a second curative to the second curable resin coating in an amount sufficient to at most partially cure the second curable resin coating.

84. A method for treating a subterranean formation comprising the steps of: applying to the subterranean formation a mixture of the coated particles of claim 64 and a hydraulic fracturing fluid and curing the particles within fractures in the subterranean formation.

85. A method for forming a gravel pack about a well bore comprising introducing the coated particles of claim 64 into the well bore.

86. The coated particle of claim 64, wherein the bond-strength retention is greater than about 70%.

87. The coated particle of claim 64, wherein the bond-strength retention is greater than about 80%.

88. The coated particle of claim 64, wherein the bond-strength retention is about 100%.

89. A coated particle comprising:
a particulate substrate, and a curable resinous coating disposed thereon, wherein the coated particle has a bond-strength retention of greater than about 70% as measured by the ratio of (i) the compressive strength measured in a UCS test, following mixing the coated particle with a 2% aqueous solution of KCl at a ratio of 12 pounds of particles per gallon of KCl solution to form a mixture, followed by heating the mixture to 200° F. for 1, 2 or 3 hours to (ii) the compressive strength measured in an UCS test following mixing the coated particles with a 2% aqueous solution of KCl at a ratio of 12 pounds of particles per gallon of KCl solution to form a mixture.

90. The coated particle of claim 89, wherein the bond-strength retention is greater than about 80%.

91. The coated particle of claim 89, wherein the bond-strength retention is greater than about 90%.

92. The coated particle of claim 89, wherein the bond-strength retention is greater than about 100%.

93. The coated particle of claim 89, wherein the coated particle has a compressive strength of greater than about 500 psi, as measured by the UCS test, following mixing the coated particle with the 2% solution of KCl to form a mixture, followed by heating the mixture to 200° F. for 2 hours.

94. The coated particle of claim 89, wherein the coated particle has a compressive strength greater than about 1000 psi, as measured by the UCS test, following mixing the coated particle with the 2% solution of KCl to form a mixture, followed by heating the mixture to 200° F. for 2 hours.

95. A method for treating a subterranean formation comprising:
applying to the subterranean formation of a mixture of the coated particles of claim 89 and a hydraulic fracturing fluid and curing the particles within fractures in the subterranean formation.

96. A method for forming a gravel pack about a well bore comprising introducing the coated particles of claim 89 into the well bore.

97. The coated particle of claim 89, wherein the heating is for 1 hour and the bond-strength retention is greater than about 70%, and wherein the mixture comprises a ratio of 12 pounds of particles per gallon of KCl solution.

98. The coated particle of claim 89, wherein the heating is for 1 hour and the bond-strength retention is greater than about 80%, and wherein the mixture comprises a ratio of 12 pounds of particles per gallon of KCl solution.

99. The coated particle of claim 89, wherein the heating is for 1 hour and the bond-strength retention is greater than about 90%, and wherein the mixture comprises a ratio of 12 pounds of particles per gallon of KCl solution.

100. The coated particle of claim 89, wherein the heating is for 1 hour and the bond-strength retention is greater than about 100%, and wherein the mixture comprises a ratio of 12 pounds of particles per gallon of KCl solution.

101. The coated particle of claim 89, wherein the heating is for 2 hours and the bond-strength retention is greater than about 70%, and wherein the mixture comprises a ratio of 12 pounds of particles per gallon of KCl solution.

102. The coated particle of claim 89, wherein the heating is for 2 hours and the bond-strength retention is greater than about 80%, and wherein the mixture comprises a ratio of 12 pounds of particles per gallon of KCl solution.

103. The coated particle of claim 89, wherein the heating is for 2 hours and the bond-strength retention is greater than about 90%, and wherein the mixture comprises a ratio of 12 pounds of particles per gallon of KCl solution.

104. The coated particle of claim 89, wherein the heating is for 2 hours and the bond-strength retention is greater than about 100%, and wherein the mixture comprises a ratio of 12 pounds of particles per gallon of KCl solution.

105. The coated particle of claim 89, wherein the coated particle has a compressive strength of greater than about 500 psi, as measured by the UCS test, following mixing the coated particle with the 2% solution of KCl to form the mixture, wherein the mixture comprises a ratio of 12 pounds of particles per gallon of KCl solution, followed by heating the mixture to 200° F. for 2 hours.

106. The coated particle of claim 89, wherein the coated particle has a compressive strength greater than about 1000 psi, as measured by the UCS test, following mixing the coated particle with the 2% solution of KCl to form the mixture, wherein the mixture comprises a ratio of 12 pounds of particles per gallon of KCl solution, followed by heating the mixture to 200° F. for 2 hours.

* * * * *